United States Patent
Suganuma et al.

(10) Patent No.: US 9,184,551 B2
(45) Date of Patent: Nov. 10, 2015

(54) LASER APPARATUS AND EXTREME ULTRAVIOLET LIGHT GENERATION SYSTEM

(71) Applicant: GIGAPHOTON INC., Tochigi-ken (JP)

(72) Inventors: Takashi Suganuma, Oyama (JP); Hidenobu Kameda, Oyama (JP); Masato Moriya, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 14/454,494

(22) Filed: Aug. 7, 2014

(65) Prior Publication Data
US 2014/0348188 A1 Nov. 27, 2014

Related U.S. Application Data

(63) Continuation of application No. PCT/IB2013/000029, filed on Jan. 9, 2013.

(30) Foreign Application Priority Data

Mar. 26, 2012 (JP) ................................. 2012-070161

(51) Int. Cl.
| | |
|---|---|
| *H01S 3/10* | (2006.01) |
| *H01S 3/104* | (2006.01) |
| *H01S 3/13* | (2006.01) |
| *H01S 3/134* | (2006.01) |
| *H01S 3/23* | (2006.01) |
| *H05G 2/00* | (2006.01) |
| *H01S 3/0971* | (2006.01) |
| *H01S 3/00* | (2006.01) |

(52) U.S. Cl.
CPC ................. *H01S 3/10* (2013.01); *H01S 3/1003* (2013.01); *H01S 3/104* (2013.01); *H01S 3/10007* (2013.01); *H01S 3/10023* (2013.01); *H01S 3/13* (2013.01); *H01S 3/1301* (2013.01); *H01S 3/134* (2013.01); *H01S 3/1305* (2013.01); *H01S 3/2308* (2013.01); *H01S 3/2391* (2013.01); *H05G 2/008* (2013.01); *H01S 3/005* (2013.01); *H01S 3/0971* (2013.01); *H01S 3/2316* (2013.01); *H01S 3/2325* (2013.01)

(58) Field of Classification Search
CPC ....... H01S 3/10; H01S 3/107; H01S 3/10023; H01S 3/1003; H01S 3/104; H01S 3/13; H01S 3/1301; H01S 3/1305; H01S 3/134; H01S 3/005; H01S 3/2308
See application file for complete search history.

(56) References Cited

U.S. PATENT DOCUMENTS

| | | | |
|---|---|---|---|
| 6,483,634 B1 | 11/2002 | Pratt et al. | |
| 2008/0285602 A1* | 11/2008 | Nagai et al. | ..................... 372/20 |
| 2010/0117009 A1 | 5/2010 | Moriya et al. | |

OTHER PUBLICATIONS

Notification Concerning transmittal of Copy of International Preliminary Report in Patentability issued in International Application No. PCT/IB2013/000029 dated Oct. 9, 2014.
International Search Report PCT1IB20131000029 dated Apr. 23, 2013.
Written Opinion of the International Searching Authority PCT/IB2013/00029 dated Apr. 23, 2013.

* cited by examiner

*Primary Examiner* — Armando Rodriguez
(74) *Attorney, Agent, or Firm* — Studebaker & Brackett PC

(57) ABSTRACT

A laser apparatus may include a master oscillator, an optical unit provided in a beam path of a laser beam from the master oscillator, a beam adjusting unit provided upstream from the optical unit in a beam path of the laser beam and configured for adjusting at least one of a beam path and a wavefront of the laser beam, a first detection unit provided between the beam adjusting unit and the optical unit in a beam path of the laser beam and configured for detecting the laser beam, a second detection unit provided downstream from the optical unit in a beam path of the laser beam and configured for detecting the laser beam, and a controller configured for controlling the beam adjusting unit based on outputs from the first and second detection units.

17 Claims, 26 Drawing Sheets

LASER APPARATUS AND EXTREME ULTRAVIOLET LIGHT GENERATION SYSTEM

CROSS-REFERENCE TO RELATED APPLICATIONS

This application is a Continuation Application of PCT/IB2013/000029 filed Jan. 9, 2013 which claims priority from Japanese Patent Application No. 2012-070161 filed Mar. 26, 2012. The subject matter of each is incorporated herein by reference in entirety.

BACKGROUND

1. Technical Field

The present disclosure relates to laser apparatuses and extreme ultraviolet (EUV) light generation systems.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus is needed which combines a system for generating EUV light at a wavelength of approximately 13 nm with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

A laser apparatus according to one aspect of the present disclosure may include a master oscillator, an optical unit provided in a beam path of a laser beam from the master oscillator, a beam adjusting unit provided upstream from the optical unit in a beam path of the laser beam and configured for adjusting at least one of a beam path and a wavefront of the laser beam, a first detection unit provided between the beam adjusting unit and the optical unit in a beam path of the laser beam and configured for detecting the laser beam, a second detection unit provided downstream from the optical unit in a beam path of the laser beam and configured for detecting the laser beam, and a controller configured for controlling the beam adjusting unit based on outputs from the first and second detection units.

A system according to another aspect of the present disclosure for generating extreme ultraviolet light may include a laser apparatus that includes a master oscillator, an optical unit provided in a beam path of a laser beam from the master oscillator, a beam adjusting unit provided upstream from the optical unit in a beam path of the laser beam and configured for adjusting at least one of a beam path and a wavefront of the laser beam, a first detection unit provided between the beam adjusting unit and the optical unit in a beam path of the laser beam and configured for detecting the laser beam, a second detection unit provided downstream of the optical unit in a beam path of the laser beam and configured for detecting the laser beam, and a controller configured for controlling the beam adjusting unit based on outputs from the first and second detection units, a chamber provided downstream from the laser apparatus in a beam path of the laser beam and having an inlet formed at a position at which the laser beam can be introduced into the chamber, a target supply device provided in the chamber and configured for supplying a target material to a predetermined region inside the chamber, and a focusing optical system configured for focusing the laser beam in the predetermined region.

BRIEF DESCRIPTION OF THE DRAWINGS

Hereinafter, selected embodiments of the present disclosure will be described with reference to the accompanying drawings.

FIG. 12A is a flowchart showing processing of obtaining an evaluation value as shown in FIG. 11.

DETAILED DESCRIPTION

Figure 1:
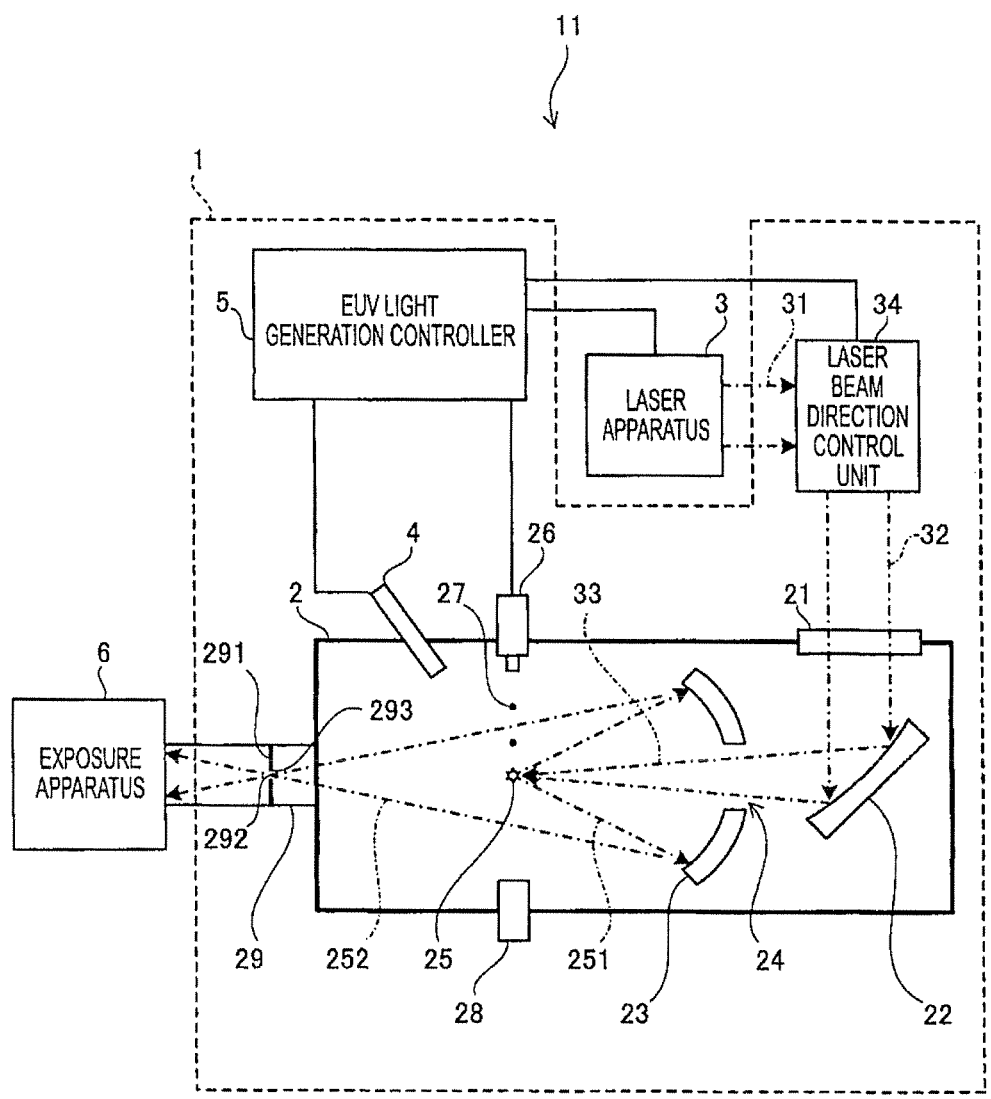
FIG. 1 schematically illustrates a configuration of an exemplary LPP-type EUV light generation system.

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

Contents
1. Overview
2. Overview of EUV Light Generation System
2.1 Configuration
2.2 Operation
3. Laser Apparatus
3.1 Configuration
3.2 Operation
4. Optical Module
4.1 General Configuration
4.2 Beam Adjusting Unit
4.3 Upstream Detection Unit
4.4 Downstream Detection Unit
4.5 Amplifier
4.6 Operation
4.6.1 Main Flow
4.6.2 Scanning Beam Path (Details of Step S200)
4.6.3 Scanning Wavefront (Details of Step S600)
4.7 Modification of Beam Adjusting Unit
4.8 Modification of Upstream Detection Unit
5. Optical Module Including Guide Laser Device
5.1 General Configuration
5.2 Upstream Detection Unit
5.3 Downstream Detection Unit
5.4 Operation
5.4.1 Main Flow
5.4.2 Controlling Laser Beam Paths to Coincide with Each Other (Details of Step S120a)
5.5 Modification of Upstream Detection Unit
5.6 Modification of Downstream Detection Unit
5.7 Modification of Amplifier
5.8 Modification of Laser Apparatus
5.9 Modification of Beam Path Adjuster
6. Configuration of Controller 1. Overview In an LPP-type EUV light generation system, a target material supplied into a chamber may be irradiated with a laser beam outputted from a laser apparatus, to thereby be turned into plasma. Light including EUV light may then be emitted from the plasma. The emitted EUV light may be collected by an EUV collector mirror provided inside the chamber to be supplied to an external apparatus such as an exposure apparatus.

A high output laser beam may be required in order to generate high output EUV light. Thus, by serially connecting a plurality of amplifiers to a master oscillator in a laser apparatus, a laser beam outputted from the master oscillator may be amplified in multistage.

However, in a laser apparatus in which a plurality of amplifiers is connected serially, an optical path length from the master oscillator to the furthest downstream amplifier may be as long as a few tens of meters. Accordingly, when an optical unit such as an amplifier or a relay optical system is replaced, tremendous labor time such as a day to a few weeks and cumbersome operation may be required for re-aligning the optical path in the laser apparatus.

2. Overview of EUV Light Generation System
2.1 Configuration

FIG. 1 schematically illustrates an exemplary configuration of an LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation system 11 may include a chamber 2 and a target supply device 26. The chamber 2 may be sealed airtight. The target supply device 26 may be mounted onto the chamber 2, for example, to penetrate a wall of the chamber 2. A target material to be supplied by the target supply device 26 may include, but is not limited to, tin, terbium, gadolinium, lithium, xenon, or any combination thereof.

The chamber 2 may have at least one through-hole or opening formed in its wall, and a pulse laser beam 32 may travel through the through-hole/opening into the chamber 2. Alternatively, the chamber 2 may have a window 21, through which the pulse laser beam 32 may travel into the chamber 2. An EUV collector mirror 23 having a spheroidal surface may, for example, be provided in the chamber 2. The EUV collector mirror 23 may have a multi-layered reflective film formed on the spheroidal surface thereof. The reflective film may include a molybdenum layer and a silicon layer, which are alternately laminated. The EUV collector mirror 23 may have a first focus and a second focus, and may be positioned such that the first focus lies in a plasma generation region 25 and the second focus lies in an intermediate focus (IF) region 292 defined by the specifications of an external apparatus, such as an exposure apparatus 6. The EUV collector mirror 23 may have a through-hole 24 formed at the center thereof so that a pulse laser beam 33 may travel through the through-hole 24 toward the plasma generation region 25.

The EUV light generation system 11 may further include an EUV light generation controller 5 and a target sensor 4. The target sensor 4 may have an imaging function and detect at least one of the presence, trajectory, position, and speed of a target 27.

Further, the EUV light generation system 11 may include a connection part 29 for allowing the interior of the chamber 2 to be in communication with the interior of the exposure apparatus 6. A wall 291 having an aperture 293 may be provided in the connection part 29. The wall 291 may be positioned such that the second focus of the EUV collector mirror 23 lies in the aperture 293 formed in the wall 291.

The EUV light generation system 11 may also include a laser beam direction control unit 34, a laser beam focusing mirror 22, and a target collector 28 for collecting targets 27. The laser beam direction control unit 34 may include an optical element (not separately shown) for defining the direction into which the pulse laser beam 32 travels and an actuator (not separately shown) for adjusting the position and the orientation or posture of the optical element.

2.2 Operation

With continued reference to FIG. 1, a pulse laser beam 31 outputted from the laser apparatus 3 may pass through the laser beam direction control unit 34 and be outputted therefrom as the pulse laser beam 32 after having its direction optionally adjusted. The pulse laser beam 32 may travel through the window 21 and enter the chamber 2. The pulse laser beam 32 may travel inside the chamber 2 along at least one beam path from the laser apparatus 3, be reflected by the laser beam focusing mirror 22, and strike at least one target 27 as a pulse laser beam 33.

The target supply device 26 may be configured to output the target(s) 27 toward the plasma generation region 25 in the chamber 2. The target 27 may be irradiated with at least one pulse of the pulse laser beam 33. Upon being irradiated with the pulse laser beam 33, the target 27 may be turned into plasma, and rays of light 251 including EUV light may be emitted from the plasma. At least the EUV light included in the light 251 may be reflected selectively by the EUV collector mirror 23. EUV light 252, which is the light reflected by the EUV collector mirror 23, may travel through the intermediate focus region 292 and be outputted to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. Further, the EUV light generation controller 5 may be configured to control at least one of: the timing when the target 27 is outputted and the direction into which the target 27 is outputted. Furthermore, the EUV light generation controller 5 may be configured to control at least one of: the timing when the laser apparatus 3 oscillates, the direction in which the pulse laser beam 31 travels, and the position at which the pulse laser beam 33 is focused. It will be appreciated that the various controls mentioned above are merely examples, and other controls may be added as necessary.

3. Laser Apparatus 3.1 Configuration

Figure 2:
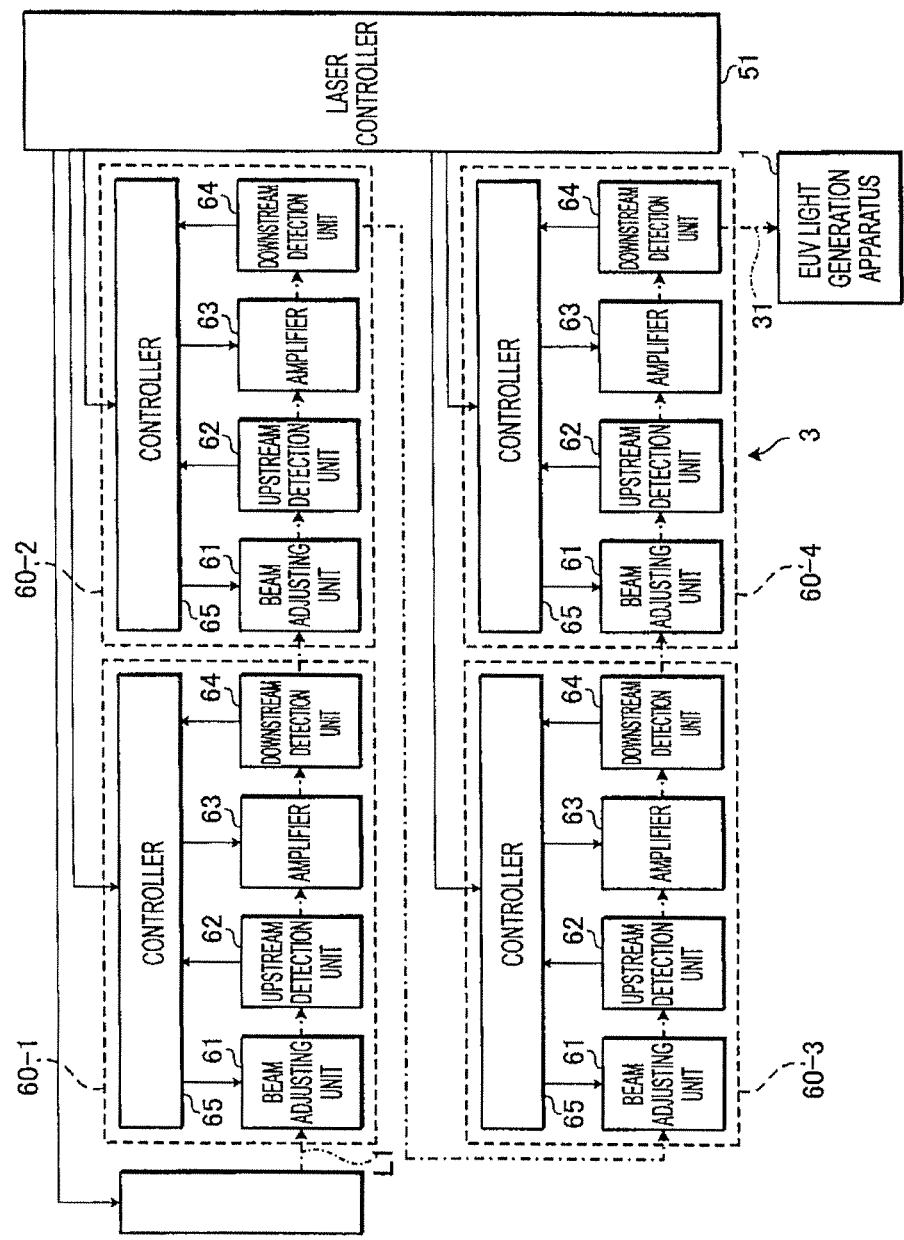
FIG. 2 is a block diagram schematically illustrating an exemplary configuration of a laser apparatus according to a first embodiment of the present disclosure.

FIG. 2 is a block diagram schematically illustrating an exemplary configuration of a laser apparatus according to a first embodiment of the present disclosure. The laser apparatus 3 may include a master oscillator MO and a plurality of optical modules 60-1 through 60-4. The master oscillator MO and the optical modules 60-1 through 60-4 may each be connected to a laser controller 51, and may operate under the control of the laser controller 51. The number of optical modules is not limited to 4. The configuration of the optical modules 60-1 through 60-4 may be the same as one another. In the description to follow, when individual optical elements are not distinguished, an optical module may be referred to as an optical module 60.

The optical modules 60-1 through 60-4 may be provided in series in a beam path of a laser beam L1 outputted from the master oscillator MO. Each of the optical modules 60 may include a beam adjusting unit 61, an upstream detection unit 62, an amplifier 63, a downstream detection unit 64, and a controller 65. The present disclosure may also be applied in a case where an optical module 60 includes a relay optical system (not separately shown) or another optical unit in place of the amplifier 63.

3.2 Operation

The master oscillator MO may be configured to output a laser beam L1. The laser beam L1 outputted from the master oscillator MO may sequentially travel through the optical modules 60-1, 60-2, 60-3, and 60-4. The laser beam L1 may be amplified by the amplifier 63 in each of the optical modules 60. The beam adjusting unit 61 in each of the optical modules 60 may adjust a beam path and/or a wavefront of the laser beam L1. The laser beam L1 that has been amplified may be outputted from the furthest downstream optical module 60-4 as a laser beam 31 and guided to the EUV light generation apparatus 1.

4. Optical Module 4.1 General Configuration

Figure 3:
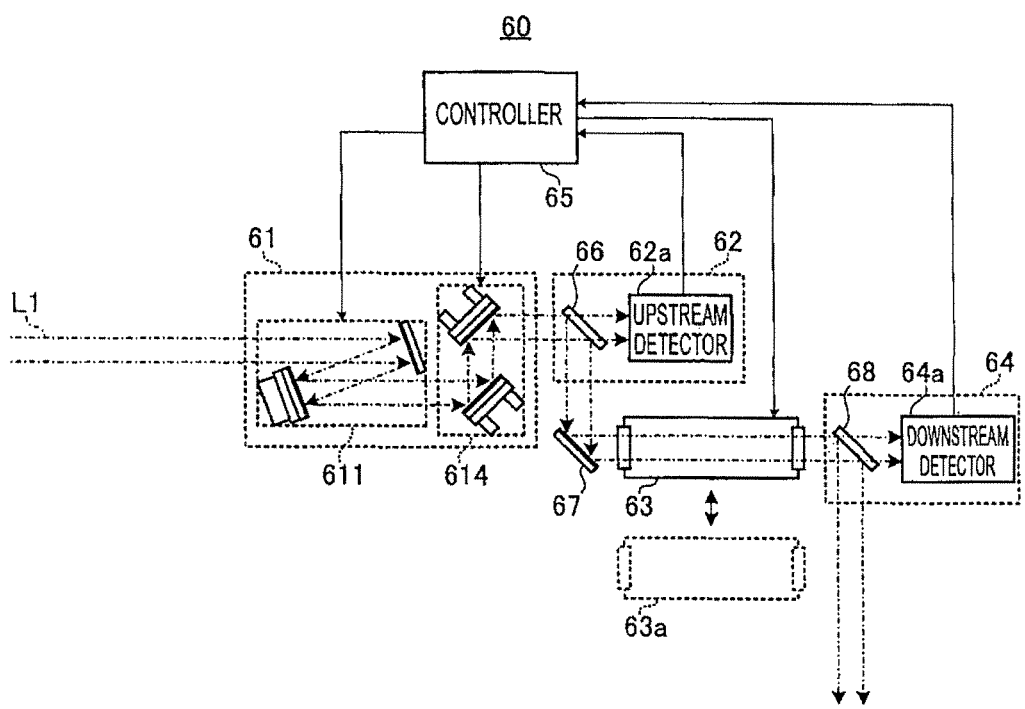
FIG. 3 schematically illustrates an exemplary configuration of an optical module according to the first embodiment.

FIG. 3 schematically illustrates an exemplary configuration of an optical module according to the first embodiment. The optical module 60 may include the beam adjusting unit 61, the upstream detection unit 62, a high-reflection mirror 67, the amplifier 63, the downstream detection unit 64, and the controller 65. The amplifier 63 may be replaceable with another amplifier 63a as necessary.

The beam adjusting unit 61 may include a wavefront adjuster 611 and a beam path adjuster 614. The wavefront adjuster 611 may be configured to adjust a wavefront of the laser beam L1. A wavefront of the laser beam L1 may, for example, be expressed by beam divergence, which will be described later. The beam path adjuster 614 may be configured to adjust a beam path of the laser beam L1. A beam path of the laser beam L1 may, for example, be expressed by a passing position, which may be expressed in a coordinate system, of the laser beam L1 and a travel direction. The travel direction may be expressed as a vector of the laser beam L1.

The upstream detection unit 62 may include a beam splitter 66 and an upstream detector 62a. The beam splitter 66 may be configured and positioned to reflect a part of the laser beam L1 from the beam adjusting unit 61 with high reflectance and transmit the remaining part of the laser beam L1 toward the upstream detector 62a. The upstream detector 62a may be configured to detect a parameter for calculating a beam path of the laser beam L1 and/or detect a parameter for calculating a wavefront of the laser beam L1, and output a detection value. A detection value from the upstream detector 62a may be sent to the controller 65.

The laser beam L1 reflected by the beam splitter 66 may be reflected by the high-reflection mirror 67 and may enter the amplifier 63. The amplifier 63 may, for example, include a $CO_2$ gas as a primary gain medium thereinside. Hereinafter, a gain medium in the amplifier 63 may be referred to as a $CO_2$ laser gas. The amplifier 63 may be supplied with electric power from a power supply (not separately shown) to cause an electric discharge to occur between electrodes (not separately shown) provided in the amplifier 63. While the electric discharge occurs, the laser beam L1 traveling through the amplifier 63 may be amplified.

The downstream detection unit 64 may include a beam splitter 68 and a downstream detector 64a. The beam splitter 68 may be configured and positioned to reflect a part of the laser beam L1 from the amplifier 63 with high reflectance and transmit the remaining part of the laser beam L1 toward the downstream detector 64a. The downstream detector 64a may be configured to detect a parameter for calculating symmetry of a beam profile of the laser beam L1 and/or detect energy of the laser beam L1, and output a detection value. A detection value from the downstream detector 64a may be sent to the controller 65.

The laser beam L1 reflected by the beam splitter 68 may be outputted from the optical module 60. The controller 65 may be configured to control the beam adjusting unit 61 based on outputs from the upstream detector 62a and the downstream detector 64a. Thus, a beam path and/or a wavefront of the laser beam L1 may be adjusted in each of the optical modules 60. Specific examples of the control by the controller 65 will be described later with reference to FIGS. 8 through 12B.

4.2 Beam Adjusting Unit

Figure 4A:
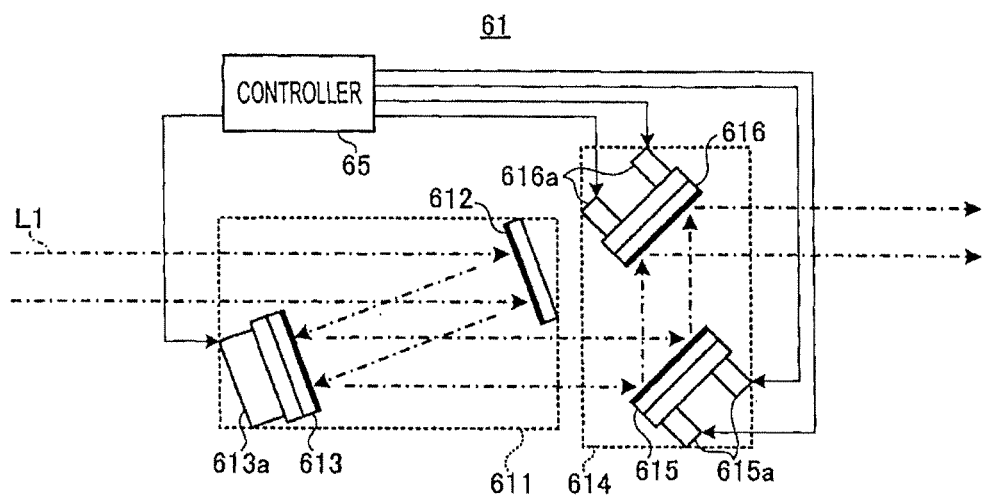
FIG. 4A schematically illustrates an exemplary configuration of a beam adjusting unit in the optical module shown in FIG. 3.
Figure 4B:
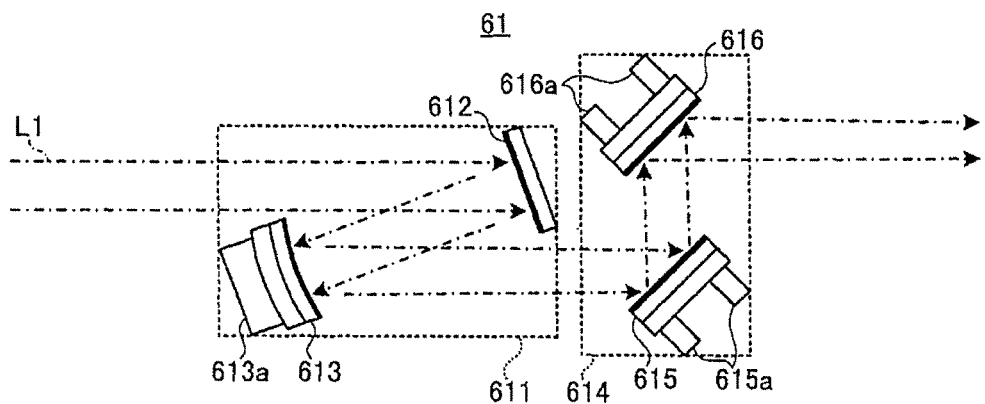
FIG. 4B shows an example of a mode for adjusting a wavefront of a laser beam with the beam adjusting unit shown in FIG. 4A.
Figure 4C:
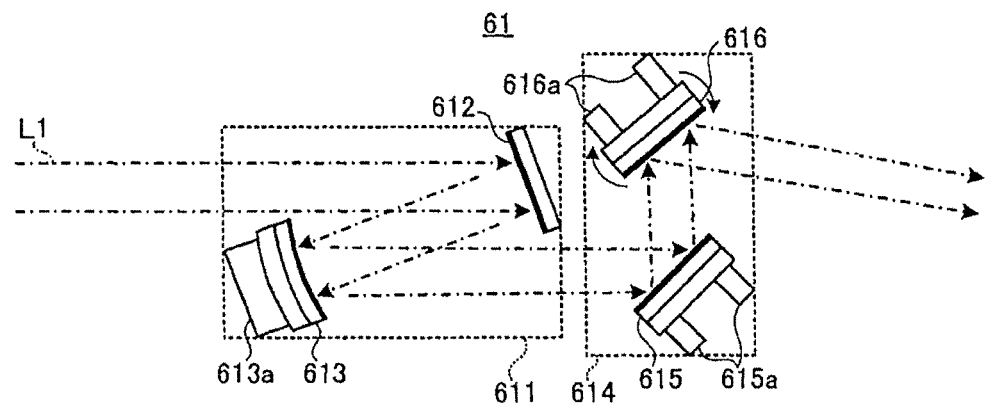
FIG. 4C shows an example of a mode for adjusting a beam path of a laser beam with the beam adjusting unit shown in FIG. 4A.

FIG. 4A schematically illustrates an exemplary configuration of a beam adjusting unit in the optical module shown in FIG. 3. FIG. 4B shows an example of a mode for adjusting a wavefront of a laser beam with the beam adjusting unit shown in FIG. 4A. FIG. 4C shows an example of a mode for adjusting a beam path of a laser beam with the beam adjusting unit shown in FIG. 4A.

The wavefront adjuster 611 may include a flat mirror 612 and a variable radius mirror (VRM) 613. The flat mirror 612 may be positioned to reflect the laser beam L1 toward the VRM 613. The curvature of the reflective surface of the VRM 613 may be modified through an actuator 613a provided on the rear side of the VRM 613. The VRM 613 may be transformed into a flat mirror, as shown in FIG. 4A. In one implementation, the VRM 613 may be transformed into a concave mirror, as shown in FIG. 4B. In another implementation, the VRM 613 may be transformed into a convex mirror (not separately shown).

When the VRM 613 is transformed into a concave mirror, as shown in FIG. 4B, a laser beam L1 having a planar wavefront incident on such VRM 613 may be reflected as a laser beam L1 having a concave wavefront. When the VRM 613 is transformed into a convex mirror, a laser beam L1 having a planar wavefront incident on such VRM 613 may be reflected as a laser beam L1 having a convex wavefront. In this way, the VRM 613 can adjust a wavefront of the laser beam L1.

The beam path adjuster 614 may include a pair of high-reflection mirrors 615 and 616. The high-reflection mirror 615 may include a plurality of actuators 615a, and the position and/or the posture of the high-reflection mirror 615 may be adjusted through the actuators 615a. Similarly, the high-reflection mirror 616 may include a plurality of actuators 616a, and the position and/or the posture of the high-reflection mirror 616 may be adjusted through the actuators 616a. As shown in FIG. 4C, as the position and/or the posture of each of the high-reflection mirrors 615 and 616 are/is adjusted, the beam path of the laser beam L1 may be adjusted.

4.3 Upstream Detection Unit

Figure 5A:
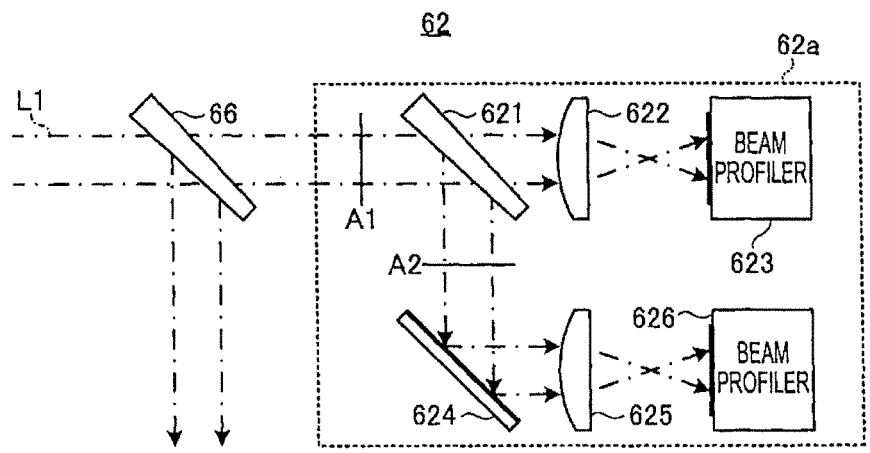
FIG. 5A schematically illustrates an exemplary configuration of an upstream detection unit in the optical module shown in FIG. 3.

FIG. 5A schematically illustrates an exemplary configuration of an upstream detection unit in the optical module shown in FIG. 3. FIG. 5A illustrates the upstream detection unit 62 configured to detect beam profiles at points A1 and A2 that are distanced from each other along a beam path of the laser beam L1. The upstream detector 62a may include beam profilers 623 and 626, transfer optical systems 622 and 625, a beam splitter 621 and a high-reflection mirror 624. Each of the beam profilers 623 and 626 may, for example, be a line sensor or a charge coupled device (CCD) camera.

The laser beam L1 may first be incident on the beam splitter 621. A part of the laser beam L1 transmitted through the beam splitter 621 may enter the beam profiler 623 through the transfer optical system 622. The transfer optical system 622 may be positioned to transfer a beam profile at the position A1 in a beam path of the laser beam L1 onto the photosensitive surface of the beam profiler 623. The beam profiler 623 may then detect a beam profile of the laser beam L1 at the position A1.

Another part of the laser beam L1 reflected by the beam splitter 621 may be reflected by the high-reflection mirror 624 and may enter the beam profiler 626 through the transfer optical system 625. The transfer optical system 625 may be positioned to transfer a beam profile at the position A2 in a beam path of the laser beam L1 onto the photosensitive surface of the beam profiler 626. The beam profiler 626 may then detect a beam profile of the laser beam L1 at the position A2.

The controller 65 (see FIG. 3) may receive detection results from the beam profilers 623 and 626 to calculate beam widths of the laser beam L1 at the positions A1 and A2, respectively, and obtain a wavefront of the laser beam L1. Further, the controller 65 may calculate centers in the cross sections of the laser beam L1 at the positions A1 and A2, respectively, to determine a beam path, or a travel direction, of the laser beam L1.

Figure 5B:
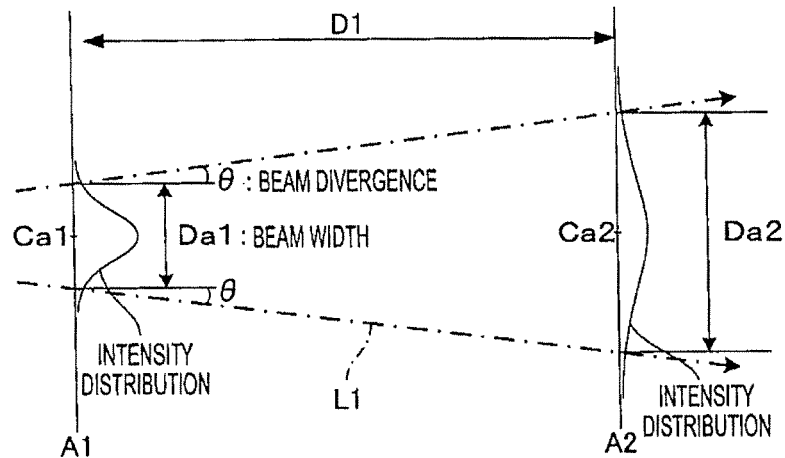
FIG. 5B is a diagram for discussing a method for obtaining a wavefront shape from a beam profile detected by an upstream detection unit.

FIG. 5B is a diagram for discussing a method for obtaining a wavefront from beam profiles detected by an upstream detection unit. Beam divergence θ may be used as a parameter for calculating a wavefront of the laser beam L1. The beam divergence θ may be obtained through Expression (1) below from a distance D1 between the position A1 and the position A2 along a beam path of the laser beam L1 and beam widths Da1 and Da2 of the laser beam L1 at the positions A1 and A2, respectively.

$$\text{Beam Divergence } \theta = \tan^{-1}\{(Da2-Da1)/2D1\} \qquad (1)$$

Here, each of the beam widths Da1 and Da2 at the positions A1 and A2 may, for example, be a width of a section having beam intensity that is equal to or higher than $1/e^2$, where e is a Napier's constant, with respect to peak intensity Imax of the laser beam L1.

Further, a curvature Pc of the wavefront of the laser beam L1 may be obtained through Expression (2) below from the beam divergence θ obtained through Expression (1) above.

$$\text{Curvature } Pc = 2 \sin \theta/(Da1) \qquad (2)$$

Figure 5C:
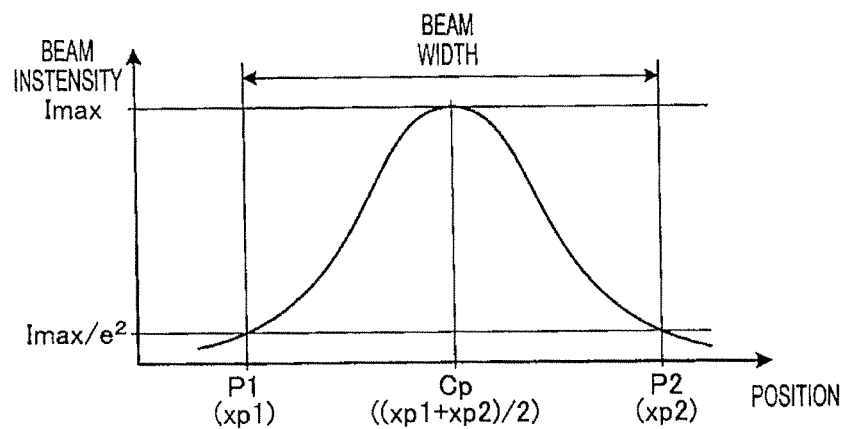
FIG. 5C is a diagram for discussing a method for obtaining a beam path from a beam profile detected by an upstream detection unit.

FIG. 5C is a diagram for discussing a method for obtaining a beam path from beam profiles detected by an upstream detection unit. In FIG. 5C, the vertical axis indicates beam intensity of the laser beam L1, and the horizontal axis indicates a position in a cross section along the x-coordinate.

When the cross section of the laser beam is substantially circular, provided that the coordinates of two points along the outline of the laser beam L1 at a given point A are P1 (xp1, yp1) and P2 (xp2, yp2), a center Cp of the laser beam L1 at the point A may be obtained through Expression (3) below.

Coordinates of the Center $Cp=((xp1+xp2)/2, (yp1+yp2)/2)$ (3)

The two points P1 and P2 may lie across from each other with the center Cp located therebetween. Here, the outline of the laser beam L1 may, for example, an outline of a section having beam intensity that is equal to or higher than $1/e^2$ with respect to beam intensity Imax of the laser beam L1. In that case, the coordinates P1 and P2 of the two points on the outline may be the coordinates of the two points specified to obtain the beam width Da1 or Da2 of the laser beam L1.

As centers Ca1 (x1, y1) and Ca2 (x2, y2) of the laser beam L1 at the positions A1 and A2 (see FIG. 5B), respectively, are obtained through Expression (3) above, a travel direction V, as a vector, of the laser beam L1 may be obtained through Expression (4) below from the centers Ca1 and Ca2.

Travel Direction $V$ as a vector$=(x2-x1, y2-y1)$ (4)

Here, although the centers Ca1 and Ca2 in the beam profiles at the positions A1 and A2, respectively, along a beam path of the laser beam L1 are used to calculate the travel direction of the laser beam L1, the present disclosure is not limited thereto. For example, centroids in the beam profiles at the positions A1 and A2 may be used in place of the centers Ca1 and Ca2.

4.4 Downstream Detection Unit

Figure 6A:
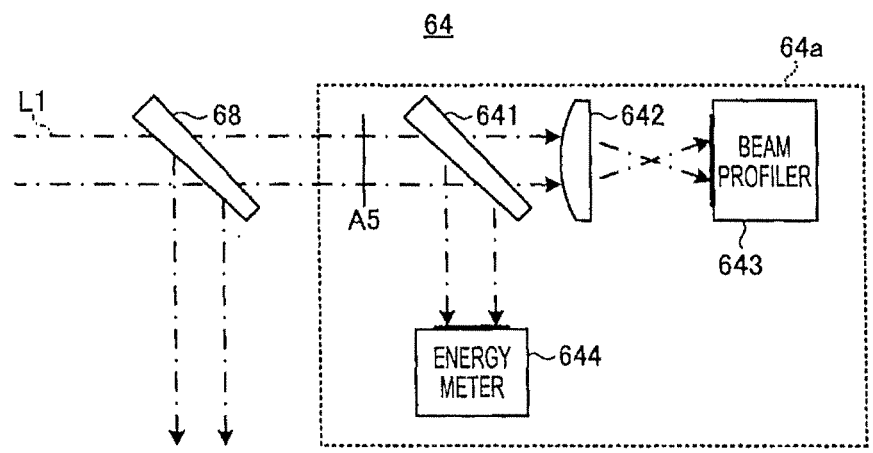
FIG. 6A schematically illustrates an exemplary configuration of a downstream detection unit in the optical module shown in FIG. 3.

FIG. 6A schematically illustrates an exemplary configuration of a downstream detection unit in the optical module shown in FIG. 3. FIG. 6A illustrates the downstream detection unit 64 configured to detect a beam profile and energy of the laser beam L1. The downstream detector 64a of the downstream detection unit 64 may include a beam splitter 641, a transfer optical system 642, a beam profiler 643, and an energy meter 644.

The laser beam L1 may first be incident on the beam splitter 641. A part of the laser beam L1 reflected by the beam splitter 641 may enter the energy meter 644. The energy meter 644 may be configured to detect the energy of the laser beam L1.

Another part of the laser beam L1 transmitted through the beam splitter 641 may enter the beam profiler 643 through the transfer optical system 642. The transfer optical system 642 may be positioned to transfer a beam profile at a position A5 along a beam path of the laser beam L1 onto the photosensitive surface of the beam profiler 643. The beam profiler 643 may be configured to detect a beam profile of the laser beam L1 at the position A5.

The controller 65 (see FIG. 3) may receive a detection result from the energy meter 644. Further, the controller 65 may receive a detection result from the beam profiler 643. The controller 65 may then calculate the center and the centroid in the cross section of the laser beam L1 at the position A5 to calculate the symmetry of the beam profile of the laser beam L1.

Figure 6B:
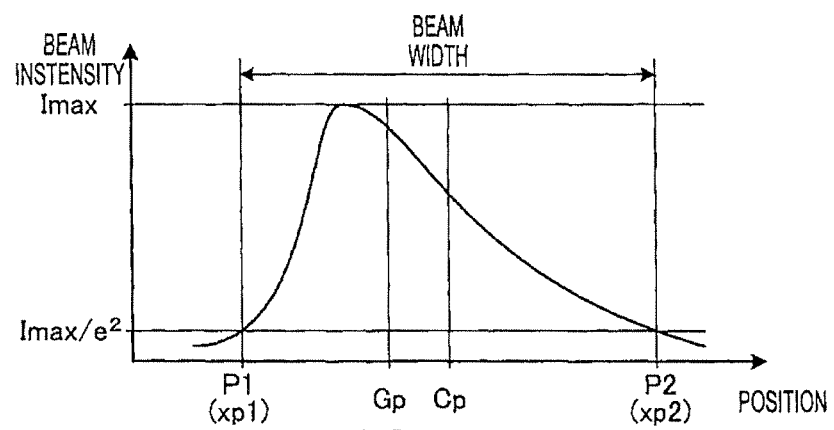
FIG. 6B is a diagram of a method for calculating a value indicating symmetry of a beam profile from a beam profile detected by a downstream detection unit.

FIG. 6B is a diagram for discussing a method for calculating a value indicating symmetry of a beam profile from a beam profile detected by a downstream detection unit. The symmetry of the beam profile of the laser beam L1 at the position A5 may, for example, be obtained by first obtaining the center Cp and a centroid Gp of the beam profile, and then by obtaining a distance between the center Cp and the centroid Gp. Processing using the obtained results will be described later.

4.5 Amplifier

Figure 7:
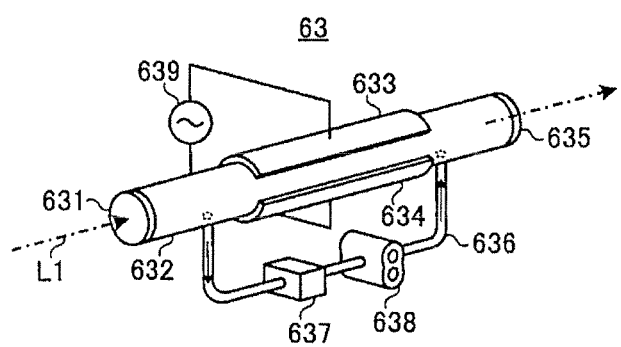
FIG. 7 schematically illustrates an exemplary configuration of an amplifier in the optical module shown in FIG. 3.

FIG. 7 schematically illustrates an exemplary configuration of an amplifier in the optical module shown in FIG. 3. FIG. 7 illustrates a fast-axial-flow amplifier 63. The fast-axial-flow amplifier 63 may include a discharge tube 632, an input window 631, an output window 635, electrodes 633 and 634, an RF power supply 639, a gas pipe 636, a heat exchanger 637, and a blower 638.

The laser beam L1 may enter the fast-axial-flow amplifier 63 through the input window 631, travel through the discharge tube 632, and be outputted through the output window 635. A gaseous gain medium may be made to circulate in the discharge tube 632 by the gas pipe 636 and the blower 638. An RF voltage may be applied between the electrodes 633 and 634 provided to sandwich the discharge tube 632 therebetween by the RF power supply 639. Then, the gain medium inside the discharge tube 632 may be pumped, and the laser beam L1 traveling through the pumped gain medium may be amplified. Heat accumulated in the gain medium by the discharge may be removed by the heat exchanger 637 provided on the gas pipe 636.

In FIG. 7, although an example where the direction in which the laser gas flows substantially coincides with the direction in which the laser beam L1 travels and where these directions are substantially perpendicular to the direction of the discharge is shown, the present disclosure is not limited thereto. A triaxial orthogonal amplifier may be used as well in which the direction in which the laser gas flows, the direction in which the laser beam L1 travels, and the direction of the discharge are substantially perpendicular to one another.

4.6 Operation 4.6.1 Main Flow

Figure 8:
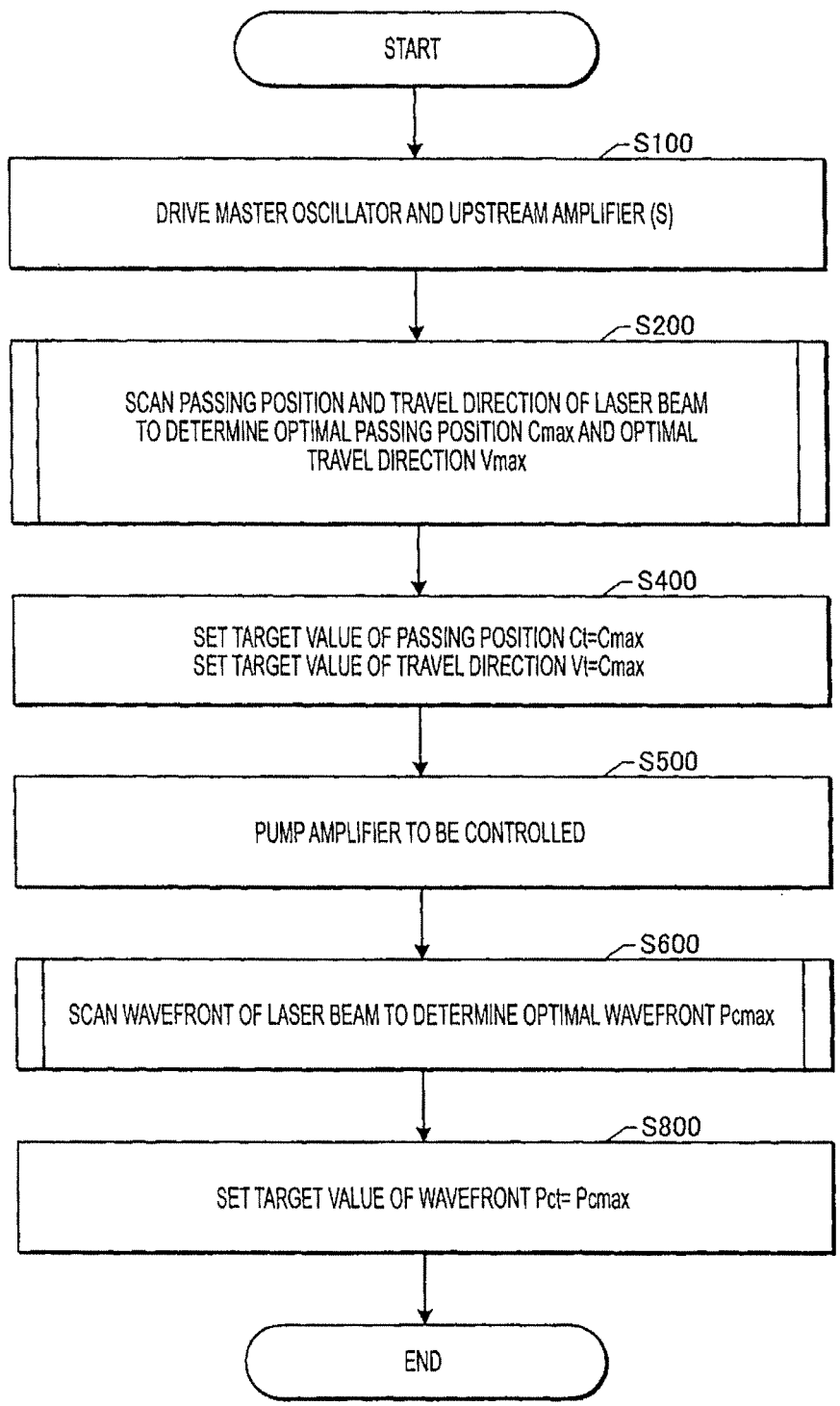
FIG. 8 is a flowchart showing an exemplary operation of a controller in the first embodiment.

FIG. 8 is a flowchart showing an exemplary operation of a controller in the first embodiment. The controller 65 may carry out the following operation in order to optimize a laser beam L1 that enters the amplifier 63.

The controller 65 may first cause the master oscillator MO (see FIG. 2) to oscillate and pump the amplifier(s) 63 upstream from an optical module 60 to be controlled (Step S100). Alternatively, the controller 65 may only cause the master oscillator MO to oscillate.

Then, the controller 65 may scan the beam path of the laser beam L1, and determine an optimal passing position Cmax and an optimal travel direction Vmax (Step S200). To scan the beam path of the laser beam L1 in a given optical module 60, the controller 65 may control the beam path adjuster 614 of the beam adjusting unit 61 to vary a beam path of the laser beam L1 by a predetermined amount until a predetermined number of data sets are obtained. The controller 65 may obtain combinations (C1, V1), (C2, V2), ..., (Cm, Vm) of a passing position and a travel direction of the laser beam L1 which are calculated from respective outputs of the upstream detection unit 62. The controller 65 may then acquire beam profiles of the laser beam L1 from the downstream detection unit 64 for the respective combinations (C1, V1), (C2, V2), ..., (Cm, Vm) to calculate the symmetry of the beam profile in each combination. Then, the controller 65 may select a combination of a passing position and a travel direction in which the symmetry is highest. The determination as to the symmetry may be made based on a distance between the center Cp and the centroid Gp in a given beam profile. The symmetry may be considered to be higher when the distance is shorter. The selected combination of the passing position and the travel direction may be determined to be the combination of an optimal passing position Cmax and an optimal travel direction Vmax. Further details of this processing will be described later with reference to FIGS. 9, 10A, and 10B.

After Step S200, the controller 65 may set the optimal passing position Cmax determined in Step S200 as a target value Ct of the passing position of the laser beam L1. Further, the controller 65 may set the optimal travel direction Vmax determined in Step S200 as a target value Vt of the travel direction of the laser beam L1 (Step S400). Subsequently, the controller 65 may pump the amplifier 63 of the optical module 60 being controlled (Step S500).

Thereafter, the controller 65 may scan a wavefront of the laser beam L1 to determine an optimal wavefront Pcmax (Step S600). To scan a wavefront of the laser beam L1, the controller 65 may control the beam adjuster 611 of the beam adjusting unit 61 to vary a wavefront of the laser beam L1 by a predetermined amount until a predetermined number of data sets are obtained. The controller 65 may acquire wavefronts Pc1, Pc2, . . . , Pcn of the laser beam L1 which are calculated from respective outputs of the upstream detection unit 62. The controller 65 may then obtain data on energy of the laser beam L1 from the downstream detection unit 64 for the respective wavefronts Pc1, Pc2, . . . , Pcn, and select a wavefront in which the energy of the laser beam L1 is highest. The selected wavefront may be determined as an optimal wavefront Pcmax. Further details of this processing will be described later with reference to FIGS. 11, 12A, and 12B.

After Step S600, the controller 65 may set the optimal wavefront Pcmax determined in Step S600 as a target value Pct for the wavefront of the laser beam L1 (Step S800). Then, the controller 65 may terminate the processing in this flowchart.

Through the above-described processing, the optimal beam path and the optimal wavefront of the laser beam L1 to enter the amplifier 63 may be determined. Then, the controller 65 may control the beam adjusting unit 61 based on the optimal beam path and the optimal wavefront to optimize the laser beam L1 to enter the amplifier 63.

4.6.2 Scanning Beam Path (Details of Step S200)

Figure 9:
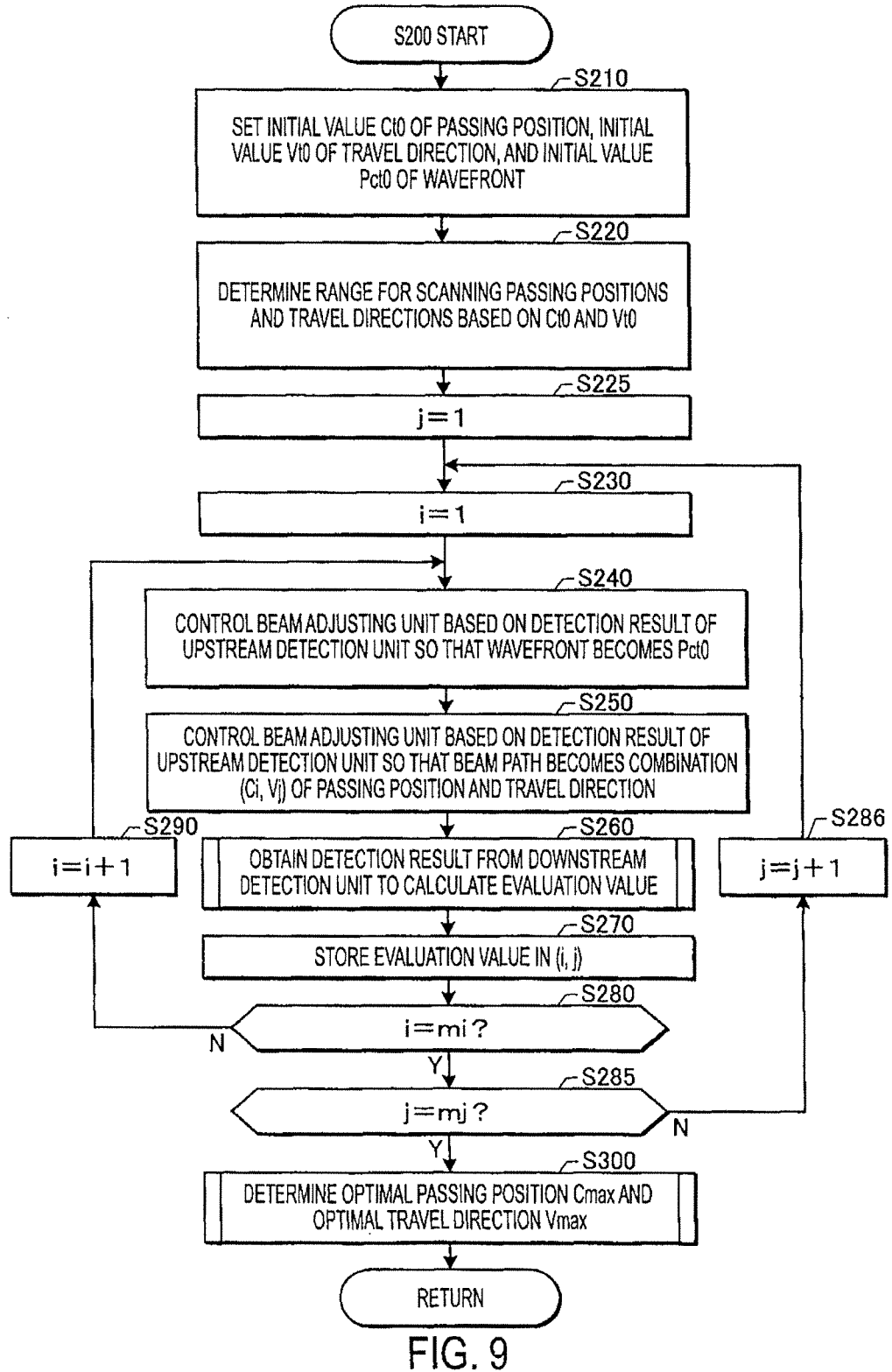
FIG. 9 is a flowchart showing processing of scanning a beam path as shown in FIG. 8.

FIG. 9 is a flowchart showing processing to scan a beam path as shown in FIG. 8. The processing shown in FIG. 9 may be carried out by the controller 65 as a subroutine of Step S200 of FIG. 8.

The controller 65 may first load from a memory a target value Ct of the passing position, a target value Vt of the travel direction, and a target value Pct of the wavefront of the laser beam L1 obtained through prior processing, and set as initial values Ct0, Vt0, and Pct0, respectively (Step S210). Here, the prior processing may, for example, be the processing shown in FIG. 8 that has been carried out prior to replacing an amplifier 63 of an optical module 60 to be controlled.

Then, the controller 65 may determine a range in which the beam path of the laser beam L1 is to be scanned (Step S220). For example, suppose a combination of a passing position and a travel direction is indicated using subscripts i (i=1, 2, . . . , $m_i$) and j (j=1, 2, . . . , $m_j$), respectively, ($m_i \times m_j$) combinations may be determined as the aforementioned range. This range may be determined with the initial values Ct0 and Vt0 of the passing position and the travel direction, respectively, taken into consideration. Subsequently, the controller 65 may set i=1 and j=1 to start scanning through the ($m_i \times m_j$) combinations (Steps S225, S230). Then, the controller 65 may proceed to Step S240.

In Step S240, the controller 65 may control the wavefront adjuster 611 based on an output of the upstream detection unit 62 so that a wavefront of the laser beam L1 substantially reaches the initial value Pct0.

Then, the controller 65 may control the beam path adjuster 614 based on an output of the upstream detection unit 62 so that the beam path of the laser beam L1 is adjusted to a beam path expressed by a given combination (Ci, Vj) of a passing position and a travel direction of the laser beam L1 (Step S250).

Subsequently, the controller 65 may obtain a detection result from the downstream detection unit 64 to calculate an evaluation value on the combination (Ci, Vj) (Step S260). Details of this processing will be described later with reference to FIG. 10A.

Thereafter, the controller 65 may store in a memory an evaluation value calculated in Step S260 as an evaluation value on the given combination (Ci, Vj) in association with the subscripts i and j (Step S270). Thereafter, the controller 65 may determine whether or not i=$m_i$ is satisfied to determine whether or not scanning through the $m_i$ combinations has been completed (Step S280). When the controller 65 determines that i=$m_i$ is not satisfied (Step S280; NO), the controller 65 may add 1 to the subscript i (Step S290), and return to Step S240. Thus, the processing may be repeated until scanning through the $m_i$ combinations is completed. When the controller 65 determines that i=$m_i$ is satisfied (Step S280; YES), the controller 65 may proceed to Step S285. In Step S285, the controller 65 may determine whether or not j=$m_j$ is satisfied to determine whether or not scanning through the ($m_i \times m_j$) combinations has been completed. When the controller 65 determines that j=$m_j$ is not satisfied (Step S285; NO), the controller 65 may add 1 to the subscript j (Step S286), and return to Step S230. Thus, the processing may be repeated until scanning through the ($m_i \times m_j$) combinations is completed. When the controller 65 determines that j=$m_j$ is satisfied (Step S285; YES), the controller 65 may proceed to Step S300.

In Step S300, the controller 65 may select from ($m_i \times m_j$) combinations the optimal passing position Cmax and the optimal travel direction Vmax based on the evaluation values obtained respectively on the ($m_i \times m_j$) combinations of the passing position and the travel direction of the laser beam L1. Then, the controller 65 may terminate the processing in this flowchart. Details of the processing in Step S300 will be described later with reference to FIG. 10B.

Figure 10A:
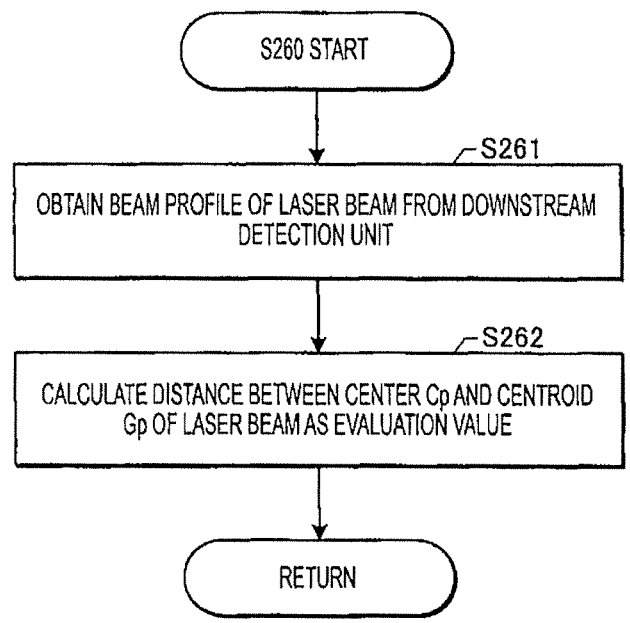
FIG. 10A is a flowchart showing processing of calculating an evaluation value as shown in FIG. 9.

FIG. 10A is a flowchart showing processing to calculate an evaluation value as shown in FIG. 9. The processing shown in FIG. 10A may be carried out by the controller 65 as a subroutine of Step S260 of FIG. 9.

Since the beam path of the laser beam L1 has been controlled to a beam path expressed by the combination (Ci, Vj) of the passing position and the travel direction in the processing prior to Step S260 described above with reference to FIG. 9, in Step S261, the controller 65 may first obtain a beam profile of the laser beam L1 for the given combination (Ci, Vj) from the downstream detection unit 64.

Subsequently, the controller 65 may calculate a distance between the center Cp and the centroid Gp of the cross section of the laser beam L1 from the received beam profile of the laser beam L1 as an evaluation value to indicate the symmetry of the beam profile (Step S262). Then, the controller 65 may terminate the processing in this flowchart.

Figure 10B:
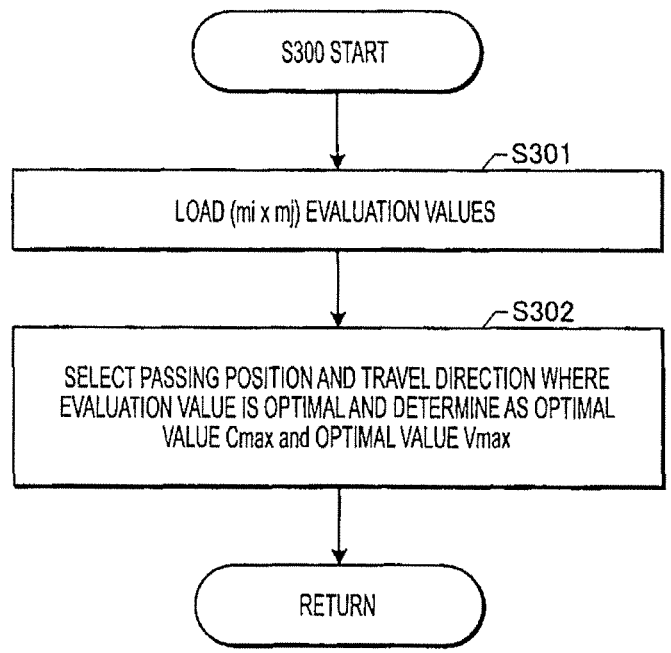
FIG. 10B is a flowchart showing processing of determining an optimal value as shown in FIG. 9.

FIG. 10B is a flowchart showing processing to determine an optimal value as shown in FIG. 9. The processing shown in FIG. 10B may be carried out by the controller 65 as a subroutine of Step S300 of FIG. 9.

Since evaluation values respectively for the ($m_i \times m_j$) combinations of (C1, V1), (C2, V1), . . . (C$m_i$, V1), (C1, V2), (C2, V2), . . . , (C$m_i$, V$m_j$) have been calculated in the processing prior to Step S300 described above with reference to FIG. 9, in Step S301, the controller 65 may first load the ($m_i \times m_j$) evaluation values from a memory.

Then, the controller 65 may select a combination (Ci, Vj) of a passing position and a travel direction in which the evaluation value is optimal based on the $(m_i \times m_j)$ evaluation values. The controller 65 may then determine the selected combination (Ci, Vj) as the optimal value (Cmax, Vmax) (Step S302). For example, the controller 65 may determine that the smaller the distance between the center Cp and the centroid Gp in a given beam profile, the higher the symmetry is. Then, the controller 65 may select the combination of the passing position and the travel direction of a case where the symmetry is highest as the optimal value. When the optical value is determined, the processing in this flowchart may be terminated.

4.6.3 Scanning Wavefront (Details of Step S600)

Figure 11:
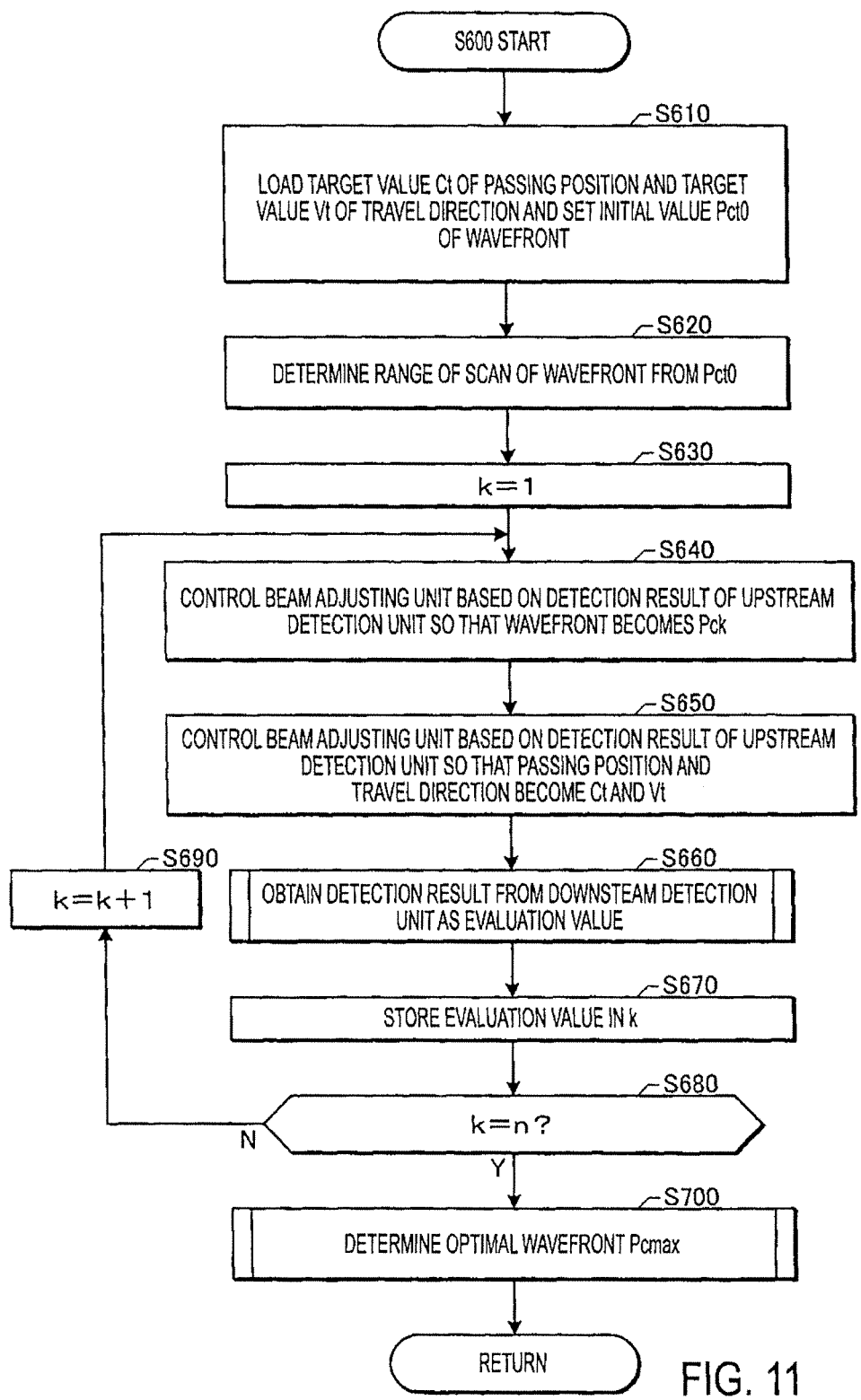
FIG. 11 is a flowchart showing processing of scanning a wavefront as shown in FIG. 8.

FIG. 11 is a flowchart showing processing to scan a wavefront as shown in FIG. 8. The processing shown in FIG. 11 may be carried out by the controller 65 as a subroutine of Step S600 of FIG. 8.

The controller 65 may first load from a memory the target value Ct of a passing position and the target value Vt of a travel direction of the laser beam L1. The stated target values Ct and Vt may be the target values Ct and Vt set in Step S400 described above with reference to FIG. 8. Further, the controller 65 may load from a memory the target value Pct of a wavefront of the laser beam L1 obtained in prior processing, and set as an initial value Pct0 (Step S610). Here, the prior processing may, for example, be the processing shown in FIG. 8 that has been carried out prior to replacing an amplifier 63 of an optical module 60 to be controlled.

Then, the controller 65 may determine a range in which a wavefront is to be scanned (Step S620). For example, provided that a wavefront is represented using a subscript k (k=1, 2, . . . , n) as in Pck, n values may be determined as the aforementioned range. This range may be determined with the initial value Pct0 of the wavefront taken into consideration. Subsequently, the controller 65 may set k=1 to start scanning through the n values (Step S630). Then, the controller 65 may proceed to Step S640.

In Step S640, the controller 65 may control the wavefront adjuster 611 based on an output of the upstream detection unit 62 so that a wavefront of the laser beam L1 becomes the wavefront Pck.

Then, the controller 65 may control the beam path adjuster 614 based on an output of the upstream detection unit 62 so that a combination of the passing position and the travel direction of the laser beam L1 substantially reaches (Ct, Vt) (Step S650).

Subsequently, the controller 65 may obtain a detection result from the downstream detection unit 64 as an evaluation value (Step S660). Details of this processing will be described later with reference to FIG. 12A.

Thereafter, the controller 65 may store in a memory an evaluation value obtained in Step S660 as an evaluation value in association with the subscript k (Step S670). Then, the controller 65 may determine whether or not k=n is satisfied to determine whether or not scanning through the n values is completed (Step S680). When the controller 65 determines that k=n is not satisfied (Step S680; NO), the controller 65 may add 1 to the subscript k (Step S690), and return to Step S640. Thus, the processing may be repeated until scanning through the n values is completed. When the controller 65 determines that k=n is satisfied (Step S680; YES), the controller 65 may proceed to Step S700.

In Step S700, the controller 65 may determine an optimal wavefront Pcmax based on the evaluation values respectively obtained for the n values of the wavefront of the laser beam L1. Then, the controller 65 may terminate the processing in this flowchart. Details of this processing in Step S700 will be described later with reference to FIG. 12B.

FIG. 12A is a flowchart showing processing to obtain an evaluation value as shown in FIG. 11. The processing shown in FIG. 12A may be carried out by the controller 65 as a subroutine of Step S660 of FIG. 11.

Since the wavefront of the laser beam L1 has been controlled to be the wavefront Pck in the processing prior to Step S660 described above with reference to FIG. 11, in Step S661, the controller 65 may first obtain the data on energy of the laser beam L1 having the wavefront Pck from the downstream detection unit 64. The obtained data on the energy may be used as the evaluation value. Thereafter, the processing in this flowchart may be terminated.

Figure 12B:
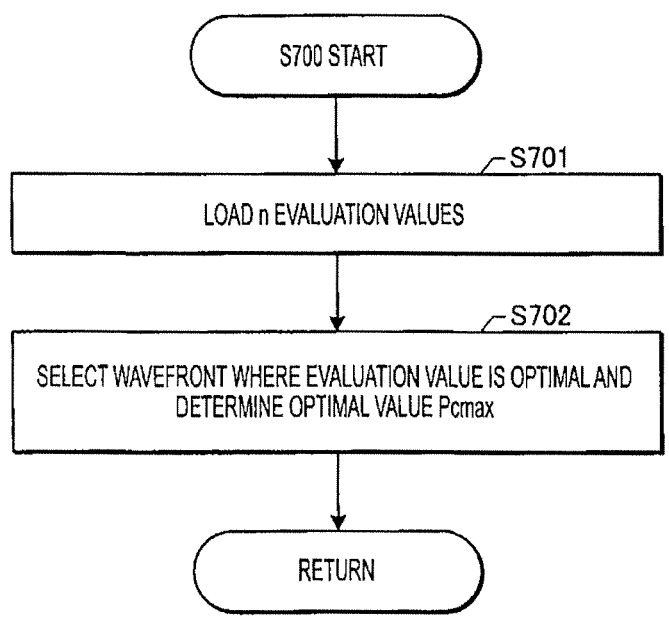
FIG. 12B is a flowchart showing processing of determining an optimal value as shown in FIG. 11.

FIG. 12B is a flowchart showing processing to determine an optimal value as shown in FIG. 11. The processing shown in FIG. 12B may be carried out by the controller 65 as a subroutine of Step S700 of FIG. 11.

Since n evaluation values of Pc1, Pc2, Pcn of the wavefront have been obtained in the processing prior to Step S700 described above with reference to FIG. 11, the controller 65 may first load the n evaluation values from a memory (Step S701).

Then, the controller 65 may select a wavefront Pck in which the evaluation value is optimal based on the n evaluation values, and determine that value as the optimal wavefront Pcmax (Step S702). For example, an evaluation value where the energy of the amplified laser beam L1 is highest may be determined as the optimal value. When the optimal value is determined, the processing in this flowchart may be terminated.

4.7 Modification of Beam Adjusting Unit

Figure 13:
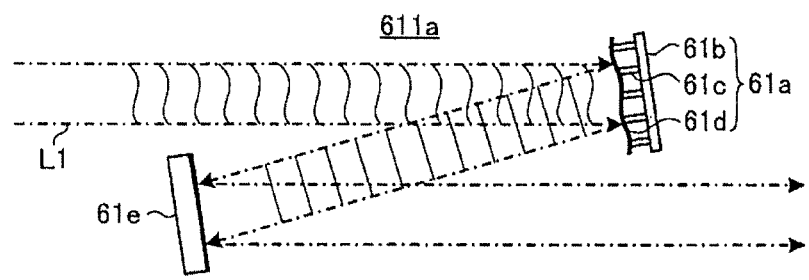
FIG. 13 schematically illustrates a first modification of a wavefront adjuster in a beam adjusting unit.

FIG. 13 schematically illustrates a first modification of a wavefront adjuster in a beam adjusting unit. In the first embodiment, the beam adjusting unit 61 may include a wavefront adjuster 61a, shown in FIG. 13, in place of the wavefront adjuster 611 shown in FIG. 4A.

The wavefront adjuster 611a may include a deformable mirror 61a. The deformable mirror 61a may include a substrate 61b, an actuator unit 61c, and a reflective layer 61d. The substrate 61b may support the actuator unit 61c that includes a plurality of piezoelectric elements. The reflective layer 61d may be formed over the piezoelectric elements forming the actuator unit 61c.

In the above-described configuration, each of the piezoelectric elements in the actuator unit 61c may deform in accordance with an externally supplied electric signal to modify the shape of the reflective layer 61d. Accordingly, even a wavefront of the laser beam L1 having a wavefront that is not spherical in shape may be adjusted with high precision.

The wavefront adjuster 611a may further include a flat mirror 61e. The flat mirror 61e may be positioned to reflect the laser beam L1 reflected by the deformable mirror 61a toward the beam path adjuster 614 (see FIG. 4A).

Figure 14:
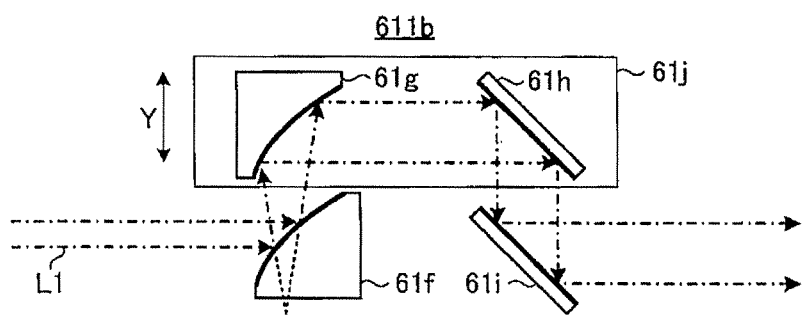
FIG. 14 schematically illustrates a second modification of a wavefront adjuster in a beam adjusting unit.

FIG. 14 schematically illustrates a second modification of a wavefront adjuster in a beam adjusting unit. In the first embodiment, the beam adjusting unit 61 may include a wavefront adjuster 611b shown in FIG. 14 in place of the wavefront adjuster 611 shown in FIG. 4A.

The wavefront adjuster 611b may include an off-axis paraboloidal convex mirror 61f, an off-axis paraboloidal concave mirror 61g, and two high-reflection mirrors 61h and 61i. The off-axis paraboloidal concave mirror 61g and the high-reflection mirror 61h may be fixed to a moving plate 61j.

The moving plate 61j may be movable in a direction that is substantially parallel to the travel direction shown by the double arrow Y in FIG. 14 of the laser beam L1 reflected by the off-axis paraboloidal convex mirror 61f. In an arrangement where the imaginary focal position of the off-axis paraboloidal convex mirror 61f coincides with the focal position of the off-axis paraboloidal concave mirror 61g, a planar wave incident on the off-axis paraboloidal convex mirror 61f may be outputted from the wavefront adjuster 611b also as a planar wave. By moving the moving plate 61i to adjust a distance between the paraboloidal convex mirror 61f and the paraboloidal concave mirror 61g, a wavefront of the laser beam L1 may be adjusted with the wavefront adjuster 611b.

Figure 15:
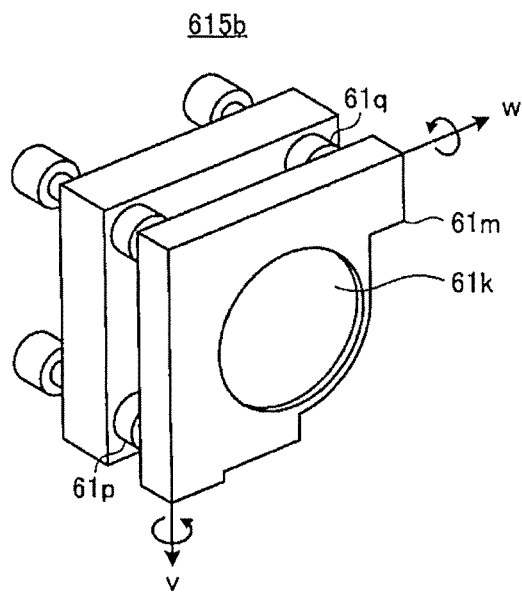
FIG. 15 schematically illustrates a modification of a beam path adjuster in a beam adjusting unit.

FIG. 15 schematically illustrates a modification of a beam path adjuster in a beam adjusting unit. A high-reflection mirror 615b shown in FIG. 15 may include a reflective part 61k, a holder 61m, and actuators 61p and 61q. The reflective part 61k may be supported by the holder 61m. The actuator 61p may deform in accordance with an externally supplied electric signal to adjust a rotation angle of the reflective part 61k and the holder 61m about a w-axis. The actuator 61q may deform in accordance with an externally supplied electric signal to adjust a rotation angle of the reflective part 61k and the holder 61m about a v-axis.

The high-reflection mirrors 615 and 616 as shown in FIG. 4A may be configured similarly to the high-reflection mirror 615b shown in FIG. 15. By combining two of such high-reflection mirrors, the beam path of the laser beam L1 may be adjusted.

4.8 Modification of Upstream Detection Unit

Figure 16:
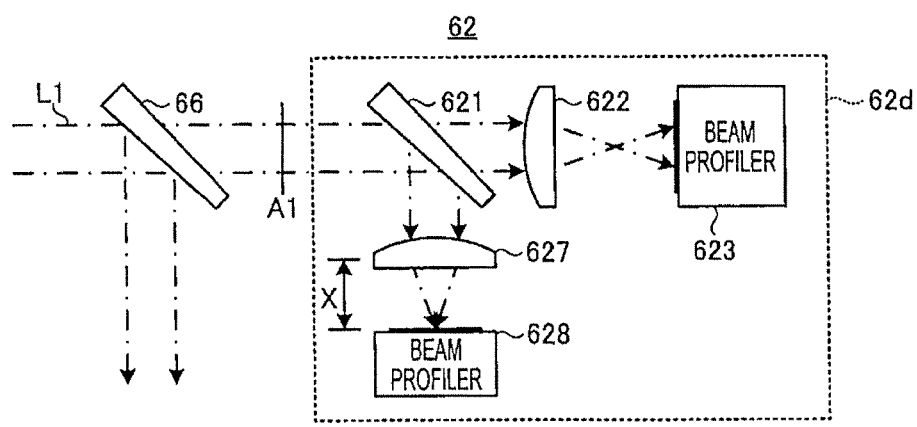
FIG. 16 schematically illustrates a first modification of an upstream detector in an upstream detection unit.

FIG. 16 schematically illustrates a first modification of an upstream detector in an upstream detection unit. In the first modification, the upstream detection unit 62 may include an upstream detector 62d shown in FIG. 16, in place of the upstream detector 62a as shown in FIG. 5A.

The upstream detector 62d may include, aside from the beam splitter 621, the transfer optical system 622, and the beam profiler 623 shown in FIG. 5A, a focusing optical system 627 and a beam profiler 628 shown in FIG. 16.

The focusing optical system 627 may be positioned to focus a part of the laser beam L1 reflected by the beam splitter 621 onto the photosensitive surface of the beam profiler 628 provided at a position distanced by a predetermined distance X from the focusing optical system 627. When the predetermined distance X is equivalent to the focal distance of the focusing optical system 627, a planar wave incident on the focusing optical system 627 may be focused on the photosensitive surface of the beam profiler 628. When the wavefront of the laser beam L1 varies, the width of the laser beam imaged on the photosensitive surface of the beam profiler 628 may vary accordingly.

The controller 65, such as shown in FIG. 3, may calculate a beam width of the laser beam L1 at the photosensitive surface of the beam profiler 628, and determine the shape of the wavefront of the laser beam L1 based on a calculation result. In FIG. 16, the beam profiler 628 may, for example, be moved along the X direction toward the focusing optical system 627. In that case, if the beam width detected by the beam profiler 628 increases, the wavefront of the laser beam L1 incident on the focusing optical system 627 may be convex. On the other hand, if the beam width detected by the beam profiler 628 decreases, the wavefront of the laser beam L1 incident on the focusing optical system 627 may be concave. Further, the controller 65 may calculate the center in a cross section detected by the beam profiler 623 as an image of the laser beam L1 at the position A1 and the center in a cross section detected by the beam profiler 628, to thereby obtain the beam path of the laser beam L1.

Figure 17:
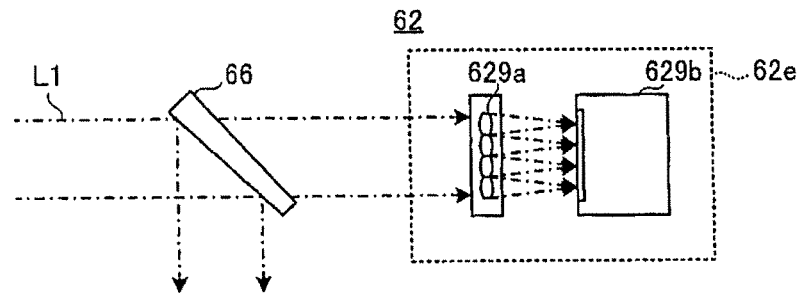
FIG. 17 schematically illustrates a second modification of an upstream detector in an upstream detection unit.

FIG. 17 schematically illustrates a second modification of an upstream detector in an upstream detection unit. In the first embodiment, the upstream detection unit 62 may include an upstream detector 62e shown in FIG. 17, in place of the upstream detector 62a as shown in FIG. 5A.

The upstream detector 62e may be a Shack-Hartmann wavefront sensor that includes a microlens array 629a and a CCD camera 629b. The microlens array 629a may be an optical element in which a plurality of fine convex lenses and a plurality of fine concave lenses are arranged two-dimensionally. The CCD camera 629b may be an element for capturing an image of the laser beam L1 focused by the microlens array 629a. Even with this configuration, the shape of the wavefront and the beam path of the laser beam L1 may be obtained.

5. Optical Module Including Guide Laser Device
5.1 General Configuration

Figure 18:
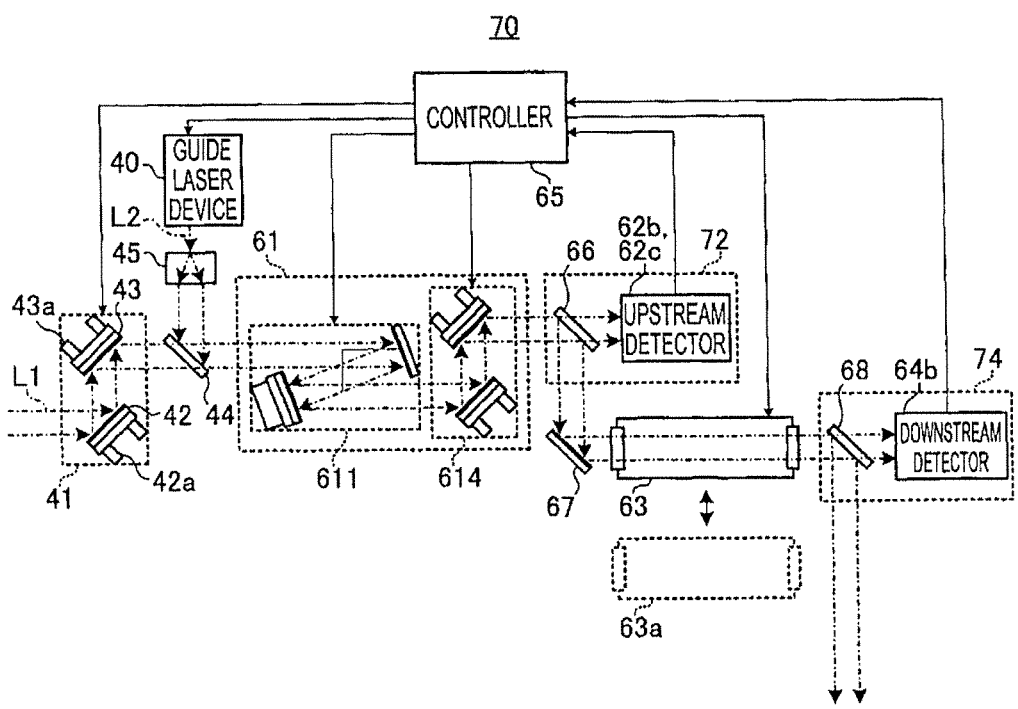
FIG. 18 schematically illustrates an exemplary configuration of an optical module according to a second embodiment of the present disclosure.

FIG. 18 schematically illustrates an exemplary configuration of an optical module according to a second embodiment of the present disclosure. An optical module 70 according to the second embodiment may include a guide laser device 40, a beam path adjuster 41, and a laser beam combiner 44.

The guide laser device 40 may be configured to output a guide laser beam L2. The wavelength of the guide laser beam L2 may be different from that of the laser beam L1. A beam expander 45 may be provided in a beam path of the guide laser beam L2. The beam expander 45 may be configured to expand the beam width of the guide laser beam L2 to substantially coincide with the beam width of the laser beam L1.

The laser beam combiner 44 may be provided in a beam path of the laser beam L1 upstream from the beam adjusting unit 61. The laser beam combiner 44 may be configured of a dichroic mirror. The laser beam combiner 44 may be positioned such that the laser beam L1 is incident on a first surface thereof and the guide laser beam L2 that has passed through the beam expander 45 is incident on a second surface thereof. The laser beam combiner 44 may be configured to transmit the laser beam L1 incident on the first surface and reflect the guide laser beam L2 incident on the second surface. The laser beam combiner 44 may be positioned at a predetermined angle with respect to the beam path of each of the laser beam L1 and the guide laser beam L2 such that the beam path of the laser beam L1 transmitted therethrough and the beam path of the guide laser beam L2 reflected thereby substantially coincide with each other. The guide laser beam L2, along with the laser beam L1, may sequentially enter the beam adjusting unit 61, the upstream detection unit 72, the amplifier 63, and the downstream detection unit 74.

The beam path adjuster 41 may be provided in a beam path of the laser beam L1 upstream from the laser beam combiner 44. The beam path adjuster 41 may include high-reflection mirrors 42 and 43. The high-reflection mirrors 42 and 43 may be provided with actuators 42a and 43a, respectively, that are configured similarly to the actuators 615a and 616a of the beam path adjuster 614 (see FIG. 4A). Accordingly, the positions and the postures of the high-reflection mirrors 42 and 43 may be adjusted through the actuators 42a and 43a, respectively. As the positions and the postures of the high-reflection mirrors 42 and 43 are adjusted, the direction in which the laser beam L1 reflected by the high-reflection mirror 43 travels may be adjusted.

The controller 65 may detect a difference, if any, between a beam path of the laser beam L1 and the beam path of the guide laser beam L2 based on a detection result of the upstream detection unit 72. The controller 65 may then control the beam path adjuster 41 to reduce the aforementioned difference. Further, the controller 65 may be configured to send a control signal to the guide laser device 40 to cause the guide laser beam L2 to be outputted or stop being outputted at desired timings.

5.2 Upstream Detection Unit

Figure 19:
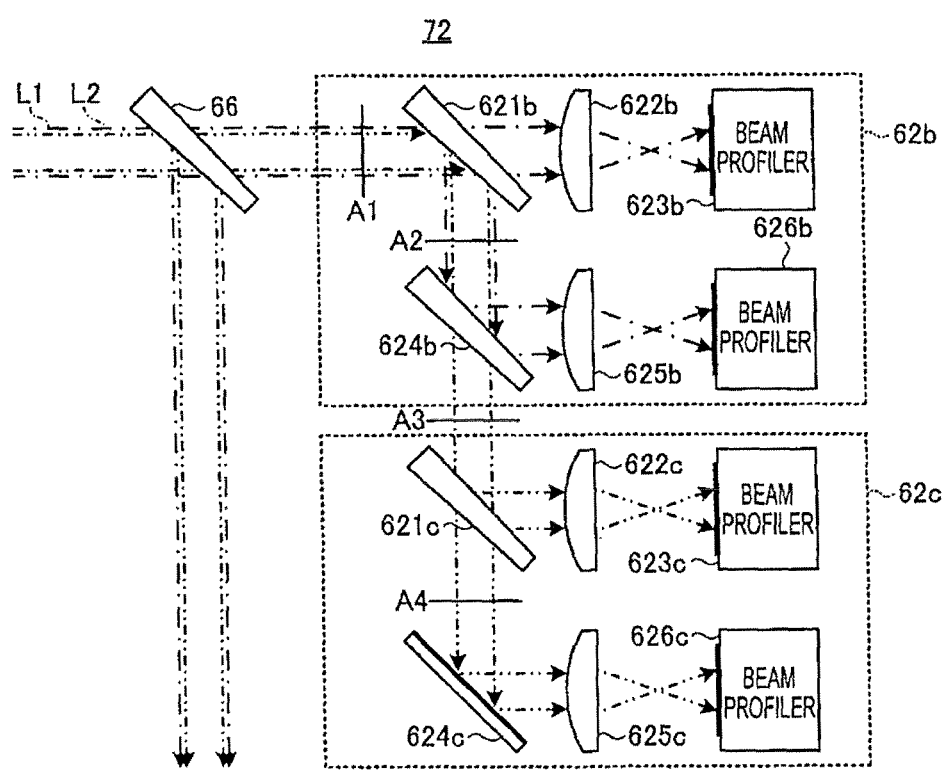
FIG. 19 schematically illustrates an exemplary configuration of an upstream detection unit in the optical module shown in FIG. 18.

FIG. 19 schematically illustrates an exemplary configuration of an upstream detection unit in the optical module shown in FIG. 18. The upstream detection unit 72 of the second embodiment may include upstream detectors 62b and 62c. The upstream detector 62b may include beam profilers 623b and 626b, transfer optical systems 622b and 625b, and beam splitters 621b and 624b. The upstream detector 62c may include beam profilers 623c and 626c, transfer optical systems 622c and 625c, a beam splitter 621c, and a high-reflection mirror 624c.

The beam splitter 621b may be configured to transmit a part of the laser beam L1 and reflect the remaining part thereof and the guide laser beam L2 with high reflectance. The beam splitter 624b may be configured to reflect the laser beam L1 with high reflectance and transmit the guide laser beam L2 with high transmittance. Accordingly, the beam profilers 623b and 626b may detect beam profiles at two positions A1 and A2 distanced from each other along a beam path of the laser beam L1.

The beam splitter 621c may be configured to transmit a part of the guide laser beam L2 and reflect the remaining part thereof. The high-reflection mirror 624c may be configured to reflect the guide laser beam L2 with high reflectance. Accordingly, the beam profilers 623c and 626c may detect beam profiles at two positions A3 and A4 distanced from each other along a beam path of the guide laser beam L2.

5.3 Downstream Detection Unit

Figure 20:
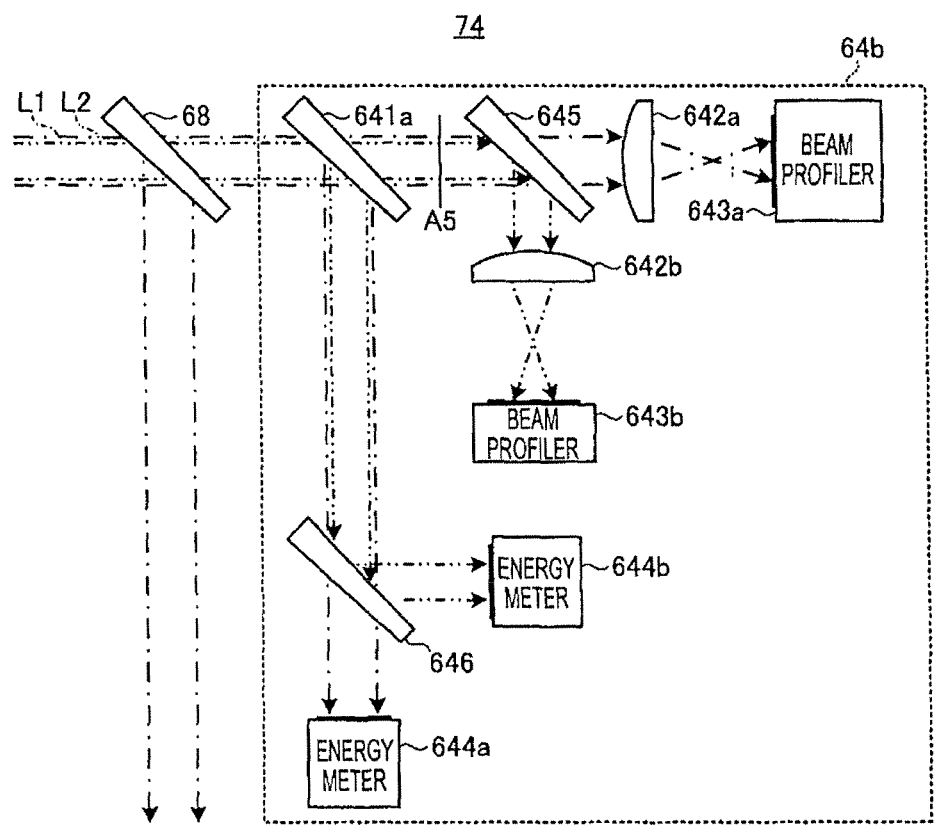
FIG. 20 schematically illustrates an exemplary configuration of a downstream detection unit in the optical module shown in FIG. 18.

FIG. 20 schematically illustrates an exemplary configuration of a downstream detection unit in the optical module shown in FIG. 18. In the downstream detection unit 74 of the second embodiment, the beam splitter 68 may be configured to reflect a part of the laser beam L1 with high reflectance and transmit the remaining part thereof and the guide laser beam L2. The downstream detection unit 74 may include a downstream detector 64b. In the downstream detector 64b, a beam splitter 641a may be configured to transmit a part of the laser beam L1 and a part of the guide laser beam L2 and reflect the remaining parts thereof. A beam splitter 645 may be provided in a beam path of a part transmitted through the beam splitter 641a, and a beam splitter 646 may provided in beam path of a part reflected by the beam splitter 641a. The beam splitters 645 and 646 may be configured to transmit the laser beam L1 with high transmittance and reflect the guide laser beam L2 with high reflectance.

A transfer optical system 642a and a beam profiler 643a may be provided in a beam path of the laser beam L1 transmitted through the beam splitter 645. Thus, the beam profiler 643a may detect a beam profile of the laser beam L1 at the position A5 along the beam path. A transfer optical system 642b and a beam profiler 643b may be provided in a beam path of the guide laser beam L2 reflected by the beam splitter 645. Thus, the beam profiler 643b may detect a beam profile of the guide laser beam L2 at the position A5 along the beam path.

An energy meter 644a may be provided in a beam path of the laser beam L1 transmitted through the beam splitter 646 to detect the energy of the laser beam L1. An energy meter 644b may be provided in a beam path of the guide laser beam L2 reflected by the beam splitter 646 to detect the energy of the guide laser beam L2.

5.4 Operation

5.4.1 Main Flow

Figure 21:
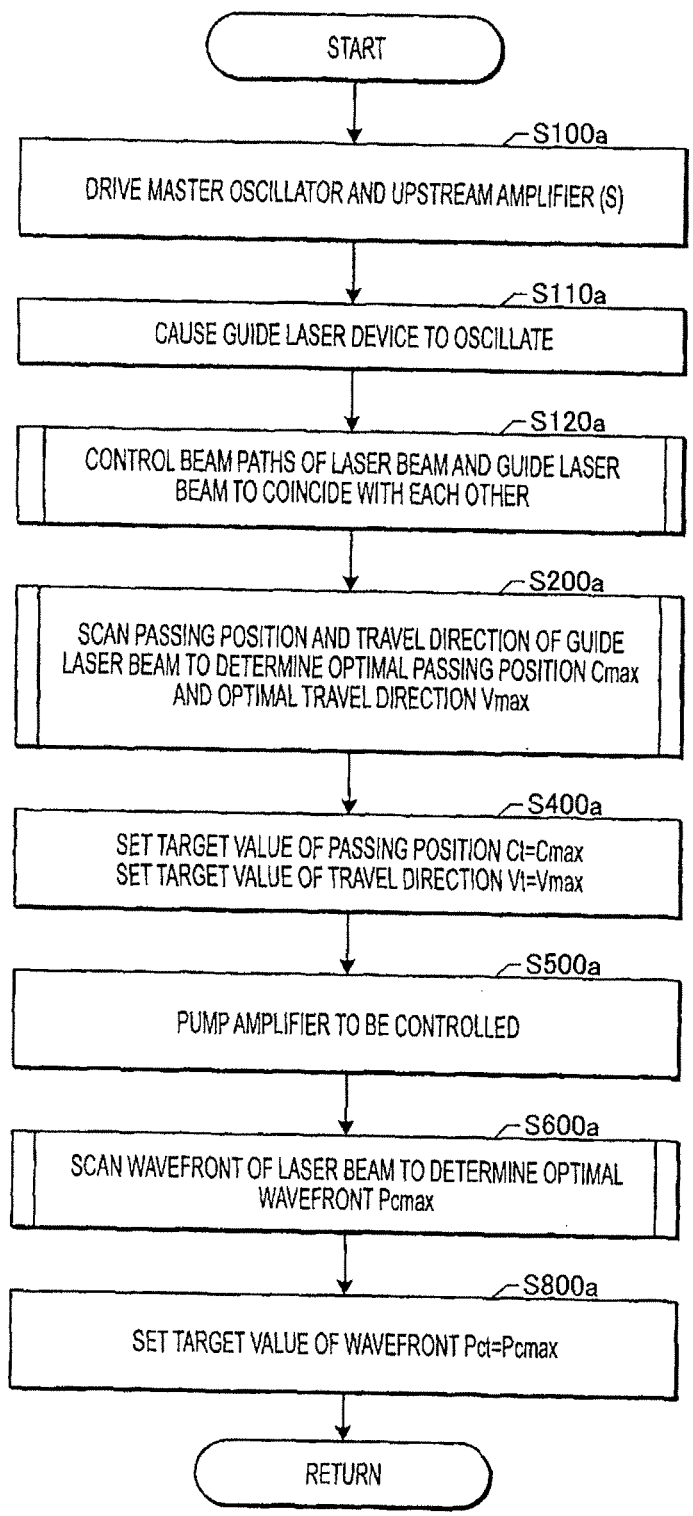
FIG. 21 is a flowchart showing an exemplary operation of a controller in the second embodiment.

FIG. 21 is a flowchart showing an exemplary operation of a controller in the second embodiment. The controller 65 may carry out the following operation to optimize a laser beam L1 that enters the amplifier 63.

The controller 65 may first cause the master oscillator MO as shown in FIG. 2 to oscillate and pump the amplifier(s) 63 upstream from an optical module 70 to be controlled (Step S100a). Alternatively, the controller 65 may only cause the master oscillator MO to oscillate.

The controller 65 may then cause the guide laser device 40 to oscillate (Step S110a). Subsequently, the controller 65 may control the beam path adjuster 41 to cause the beam paths of the laser beam L1 and the guide laser beam L2 to coincide with each other (Step S120a). Details of this processing will be described later with reference to FIG. 22. Once the beam paths of the laser beam L1 and the guide laser beam L2 are controlled to coincide with each other, the controller 65 may turn off the master oscillator MO and the upstream amplifier(s) 63.

Then, the controller 65 may scan a beam path of the guide laser beam L2, and determine an optimal passing position Cmax and an optimal travel direction Vmax (Step S200a). The processing in Step 200a may be similar to Step S200 of the first embodiment described with reference to FIG. 8 except the guide laser beam L2 is used in place of the laser beam L1 in Step 200a.

In Steps S400a through S800a, processing similar to those in Steps S400 through S800 of the first embodiment shown in FIG. 8 may be carried out to control the beam adjusting unit 61. In Step S600a, a wavefront of the laser beam L1, in place of that of the guide laser beam L2, may be scanned to determine an optimal wavefront Pcmax. In Step S500a, if the master oscillator MO and the amplifier(s) 63 upstream from the optical module 70 to be controlled are turned off, the master oscillator MO and the amplifier(s) 63 may be driven again.

5.4.2 Controlling Laser Beam Paths to Coincide with Each Other (Details of Step S120a)

Figure 22:
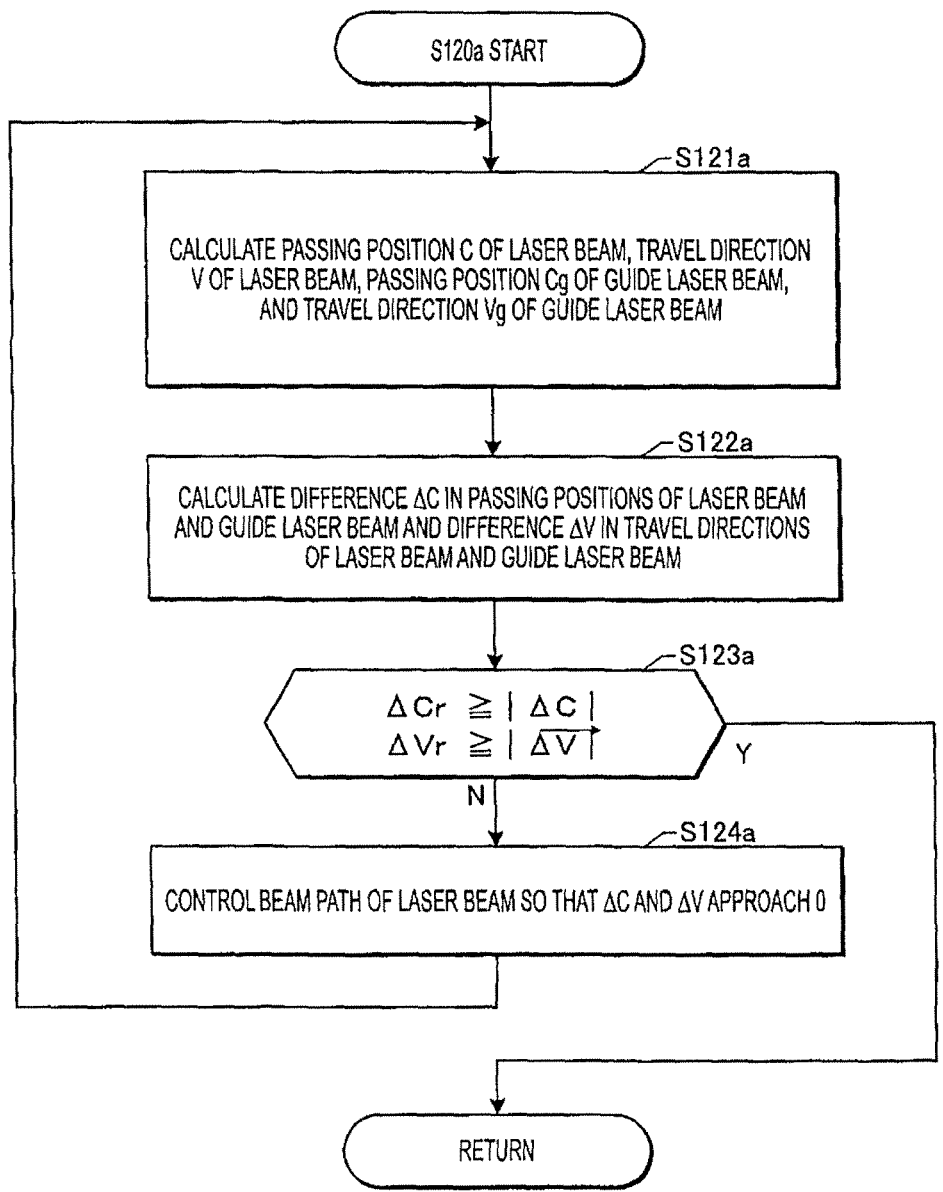
FIG. 22 is a flowchart showing processing of controlling laser beam paths to coincide with each other as shown in FIG. 21.

FIG. 22 is a flowchart showing processing of causing laser beam paths to coincide with each other as shown in FIG. 21. The processing shown in FIG. 22 may be carried out by the controller 65 as a subroutine of Step S120a of FIG. 21.

The controller 65 may first calculate a passing position C and a travel direction V of the laser beam L1 and a passing position Cg and a travel direction Vg of the guide laser beam L2 from an output of the upstream detection unit 72 (Step S121a).

Then, the controller 65 may calculate a difference $\Delta C$ between the passing position C of the laser beam L1 and the passing position Cg of the guide laser beam L2, and a difference $\Delta V$ between the travel direction V of the laser beam L1 and the travel direction Vg of the guide laser beam L2 through Expressions (5) and (6) below (Step S122a).

$$\Delta C = Cg - C \quad (5)$$

$$\Delta V = Vg - V \quad (6)$$

Here, $\Delta V$, Vg, and V may be vectors.)

Subsequently, the controller 65 may determine whether or not $\Delta C$ and $\Delta V$ fall within respective permissible ranges (Step S123a). For example, the controller 65 may determine whether or not the absolute value $|\Delta C|$ of $\Delta C$ and the absolute value $|\Delta V|$ of $\Delta V$ satisfy Expressions (7) and (8) below to determine whether or not the absolute values $|\Delta C|$ and $|\Delta V|$ are equal to or lower than predetermined threshold values $\Delta Cr$ and $\Delta Vr$.

$$\Delta Cr \geq |\Delta C| \quad (7)$$

$$\Delta Vr \geq |\Delta V| \quad (8)$$

In Step S123a, when the differences ΔC and ΔV do not fall within the respective permissible ranges (Step S123a; NO), the controller 65 may send a control signal to the beam path adjuster 41 to control the beam path of the laser beam L1 such that the differences ΔC and ΔV approach 0 (Step S124a). Thereafter, the controller 65 may return to Step S121a.

In Step S123a, when the differences ΔC and ΔV fall within the respective permissible ranges (Step S123a; YES), the beam paths of the laser beam L1 and the guide laser beam L2 are made to substantially coincide with each other, thus terminating the processing in this flowchart.

According to the second embodiment, the beam paths of the guide laser beam L2 and the laser beam L1 are made to coincide with each other prior to entering the beam adjusting unit 61, and the beam adjusting unit 61 may be controlled using the guide laser beam L2. Thus, the beam adjusting unit 61 may be controlled even when the master oscillator MO is not driven. As a result, the laser beam L1 is not outputted.

5.5 Modification of Upstream Detection Unit

Figure 23:
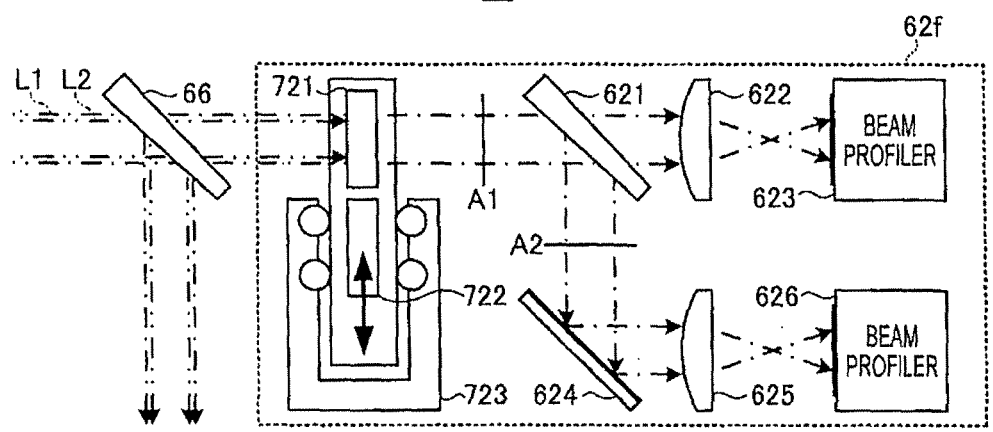
FIG. 23 schematically illustrates a third modification of an upstream detector in an upstream detection unit.

FIG. 23 schematically illustrates a third modification of an upstream detector in an upstream detection unit. In the second embodiment, the upstream detection unit 72 may include an upstream detector 62f shown in FIG. 23, in place of the upstream detectors 62b and 62c as shown in FIG. 19.

The upstream detector 62f may have a configuration that allows a first or second optical filter 721 or 722 to be placed in a beam path between the beam splitter 66 and the beam splitter 621 of the upstream detection unit 62 described with reference to FIG. 5A. The first optical filter 721 may be configured to transmit the laser beam L1 with high transmittance and attenuate or block rays at other wavelengths. The second optical filter 722 may be configured to transmit the guide laser beam L2 with high transmittance and attenuate or block rays at other wavelengths.

When the first optical filter 721 is placed in the beam path of the laser beam L1 and the guide laser beam L2 through a driving mechanism 723, the upstream detector 62f may detect a beam path and a wavefront of the laser beam L1. When the second optical filter 722 is placed in the beam path of the laser beam L1 and the guide laser beam L2 through the driving mechanism 723, the upstream detector 62f may detect a beam path and a wavefront of the guide laser beam L2.

5.6 Modification of Downstream Detection Unit

Figure 24:
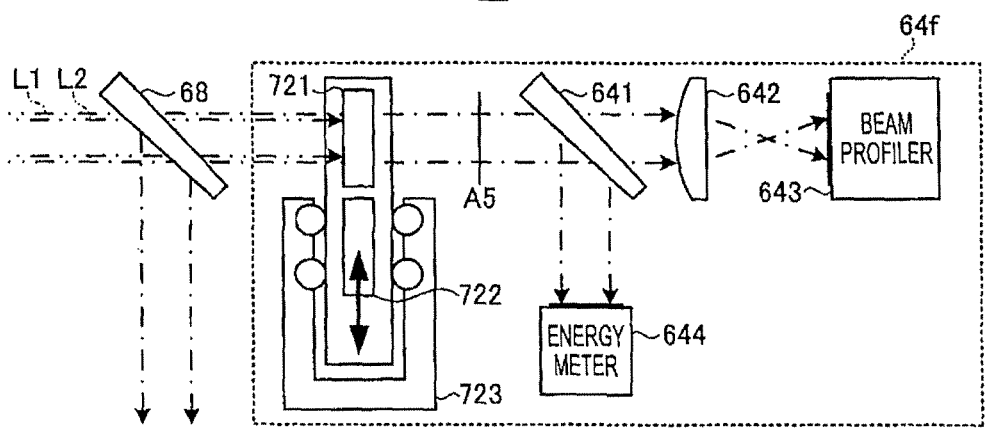
FIG. 24 schematically illustrates a modification of a downstream detector in a downstream detection unit.

FIG. 24 schematically illustrates a modification of a downstream detector in a downstream detection unit. In the second embodiment, the downstream detection unit 74 may include a downstream detector 64f shown in FIG. 24, in place of the downstream detector 64b shown in FIG. 20.

The downstream detector 64f may have a configuration that allows the first or second optical filter 721 or 722 to be placed in a beam path between the beam splitter 68 and the beam splitter 641 of the downstream detection unit 64 described with reference to FIG. 6A. The first optical filter 721 may be configured to transmit the laser beam L1 with high transmittance and attenuate or block rays at other wavelengths. The second optical filter 722 may be configured to transmit the guide laser beam L2 with high transmittance and attenuate or block rays at other wavelengths.

When the first optical filter 721 is placed in the beam path of the laser beam L1 and the guide laser beam L2 through the driving mechanism 723, the downstream detector 64f may detect energy of the laser beam L1 and the beam profile thereof at the position A5 along the beam path. When the second optical filter 722 is placed in the beam path of the laser beam L1 and the guide laser beam L2 through the driving mechanism 723, the downstream detector 64f may detect energy of the guide laser beam L2 and the beam profile thereof at the position A5 along the beam path.

5.7 Modification of Amplifier

Figure 25A:
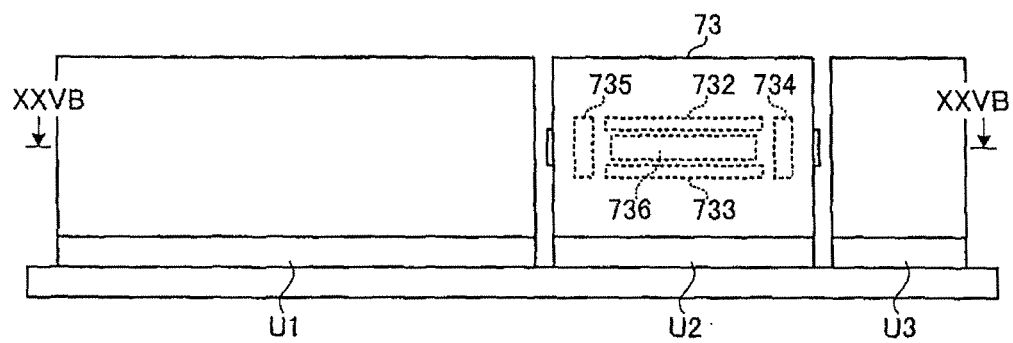
FIG. 25A is a side view illustrating a first modification of an amplifier.
Figure 25B:
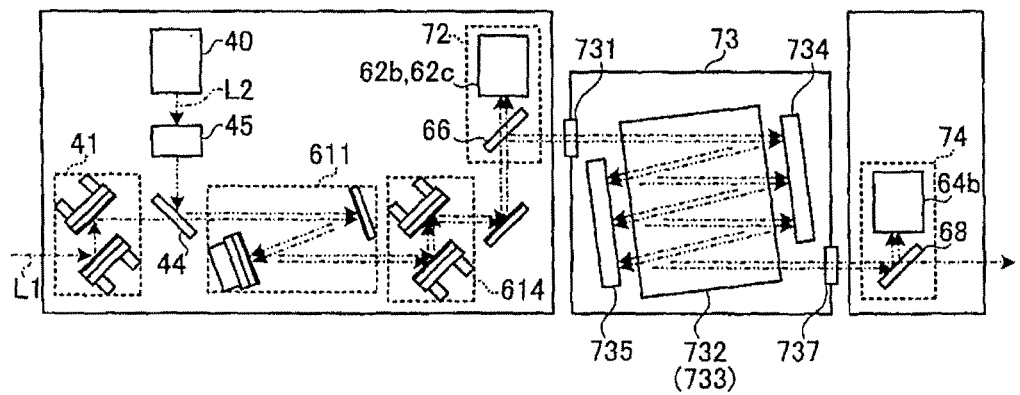
FIG. 25B is a sectional view of the amplifier shown in FIG. 25A, taken along XXVB-XXVB plane.

FIG. 25A is a side view illustrating a first modification of an amplifier. FIG. 25B is a sectional view of the amplifier shown in FIG. 25A, taken along XXVB-XXVB plane. In the second embodiment, the optical module 70 may include an amplifier 73 shown in FIGS. 25A and 25B, in place of the amplifier 63 shown in FIG. 18.

The amplifier 73 may include an input window 731, a pair of discharge electrodes 732 and 733, a pair of mirrors 734 and 735, and an output window 737. A space to serve as a gain region 736 may be secured between the pair of discharge electrodes 732 and 733. The laser beam L1 and the guide laser beam L2 that have entered the amplifier 73 through the input window 731 may travel back and forth between the pair of mirrors 734 and 735 to travel through the gain region 736 multiple times, and be outputted through the output window 737.

The amplifier 73 may be mounted and positioned on a frame U2. The guide laser device 40, the beam path adjuster 41, the laser beam combiner 44, the wavefront adjuster 611, the beam path adjuster 614, and the upstream detection unit 72 may be housed in a single housing and mounted on a frame U1. The housing mounted on the frame U1 may be positioned such that the laser beam L1 and the guide laser beam L2 from the upstream detection unit 72 enter the amplifier 73 through the input window 731. The downstream detection unit 74 shown in FIG. 18 may be housed in another housing and mounted on a frame U3. The housing mounted on the frame U3 may be positioned such that the laser beam L1 and the guide laser beam L2 outputted from the amplifier 73 through the output window 737 enter the downstream detection unit 74.

Figure 26A:
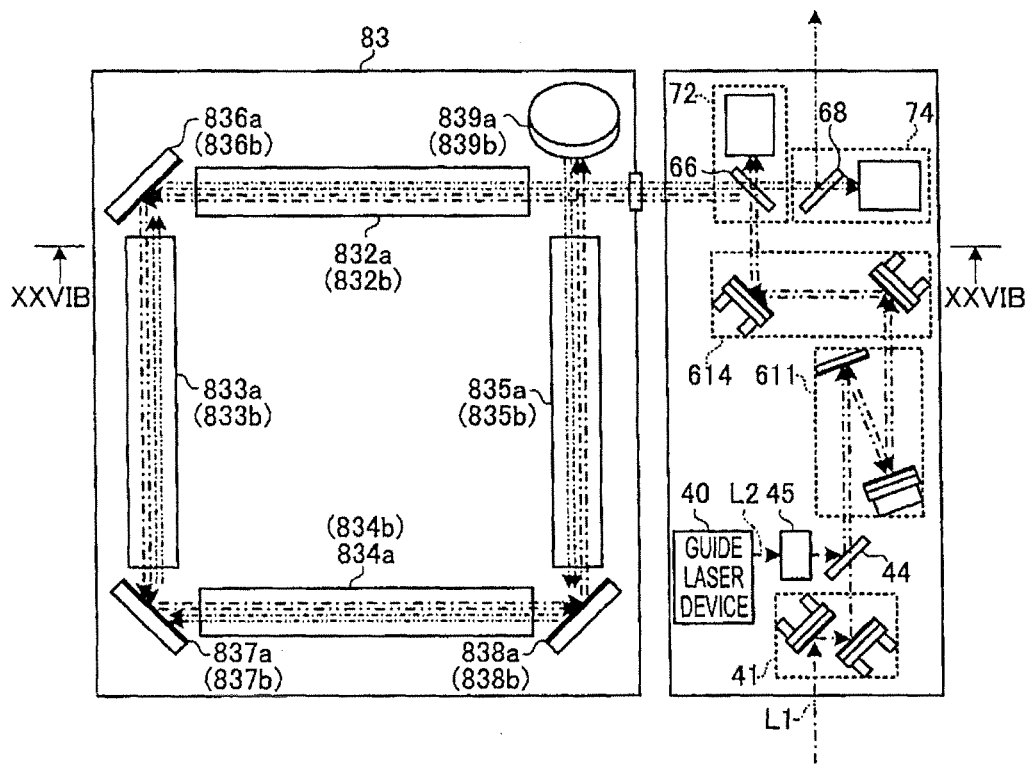
FIG. 26A is a plan view illustrating a second modification of an amplifier.
Figure 26B:
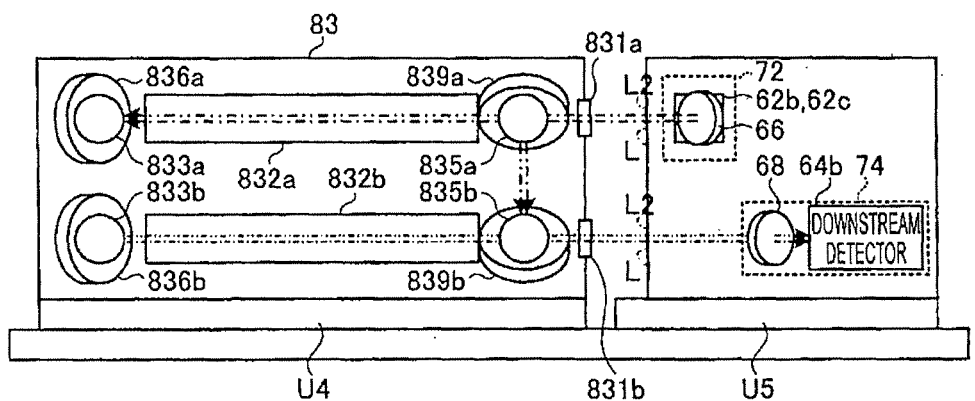
FIG. 26B is a sectional view of the amplifier shown in FIG. 26A, taken along XXVIB-XXVIB plane.

FIG. 26A is a plan view illustrating a second modification of an amplifier. FIG. 26B is a sectional view of the amplifier shown in FIG. 26A, taken along XXVIB-XXVIB plane. In the second embodiment, the optical module 70 may include an amplifier 83 shown in FIGS. 26A and 26B, in place of the amplifier 63 shown in FIG. 18.

The amplifier 83 may include an input window 831a, upper discharge tubes 832a through 835a, and upper high-reflection mirrors 836a through 839a. Further, the amplifier 83 may include lower discharge tubes 832b through 835b and lower high-reflection mirrors 836b through 839b. The lower discharge tubes 832b through 835b and lower high-reflection mirrors 836b through 839b are arranged underneath the upper discharge tubes 832a through 835b and the upper high-reflection mirrors 836a through 839a, and thus are hidden in FIG. 26A.

The laser beam L1 and the guide laser beam L2 that have entered the amplifier 83 through the input window 831a may sequentially travel through the upper discharge tubes 832a, 833a, 834a, and 835a. Then, the laser beam L1 and the guide laser beam L2 may sequentially travel through the lower discharge tubes 835b, 834b, 833b, and 832b, and may be outputted through the output window 831b.

The amplifier 83 may be mounted and positioned on a frame U4. The guide laser device 40, the beam path adjuster 41, the laser beam combiner 44, the wavefront adjuster 611, the beam path adjuster 614, and the upstream detection unit 72 may be housed in a single housing. The downstream detection unit 74 shown in FIG. 18 may also be housed in the aforementioned housing. This housing may be mounted and positioned on a frame U5.

5.8 Modification of Laser Apparatus

Figure 27:
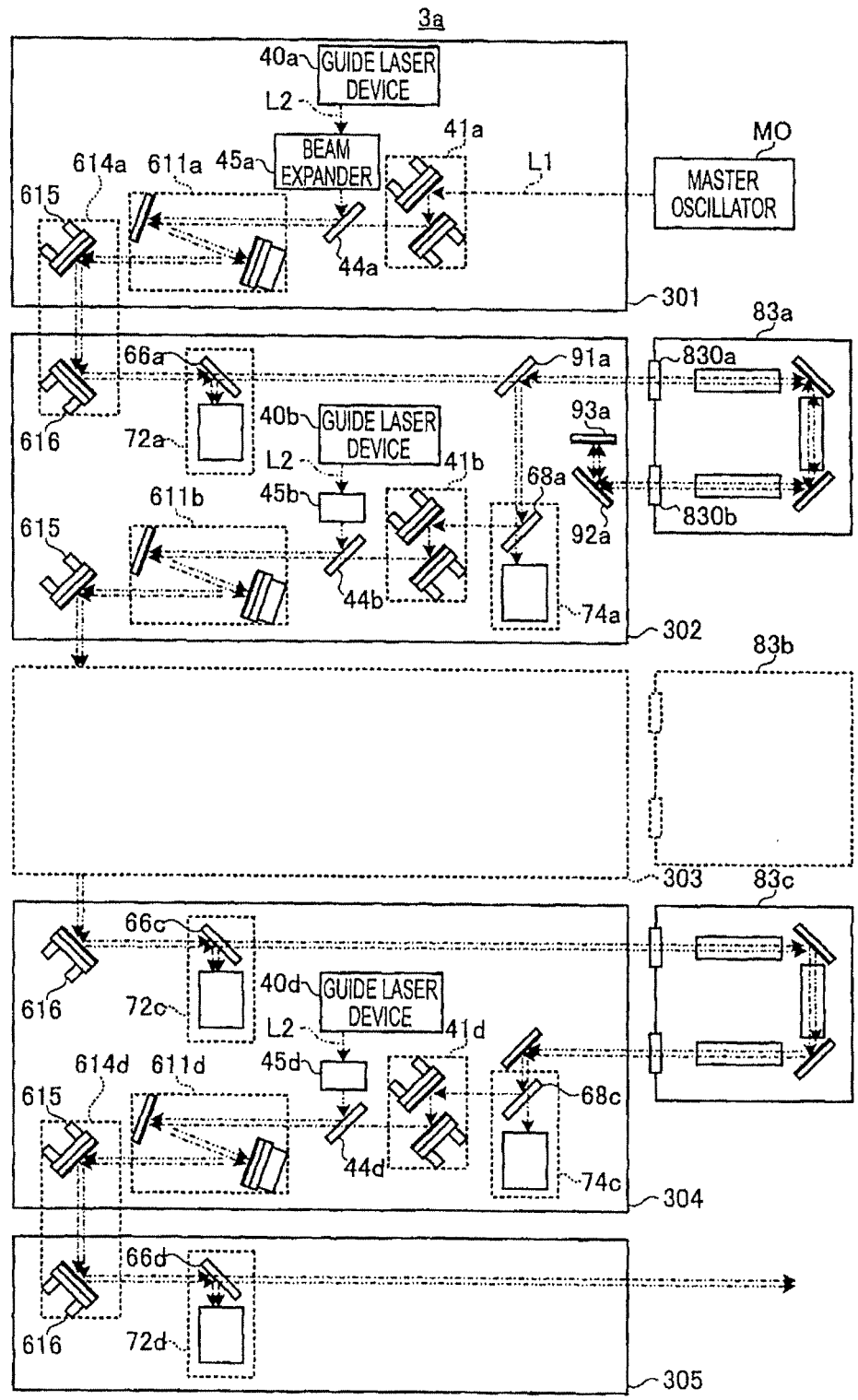
FIG. 27 is a plan view illustrating a modification of a laser apparatus.

FIG. 27 is a plan view illustrating a modification of a laser apparatus. In the second embodiment, a laser apparatus 3a shown in FIG. 27 may be used, in place of the laser apparatus 3 shown in FIG. 2. The controller is not depicted in FIG. 27.

The laser apparatus 3b may include amplifiers 83a, 83b, and 83c each configured similarly to the amplifier 83 shown in FIGS. 26A and 26B. Of optical devices provided upstream from the amplifier 83a, a guide laser device 40a, a beam path adjuster 41a, a laser beam combiner 44a, a wavefront adjuster 611a, and the high-reflection mirror 615 may be housed in a housing 301. Meanwhile, the high-reflection mirror 616 and an upstream detection unit 72a provided upstream from the amplifier 83a and a downstream detection unit 74a provided downstream from the amplifier 83a may be housed in a housing 302. By adjusting the high-reflection mirrors 615 and 616 housed respectively in the housings 301 and 302, a deviation of the beam path may be suppressed even when the housings 301 and 302 are misaligned.

Of optical devices provided upstream from the amplifier 83b, a guide laser device 40b, a beam path adjuster 41b, a laser beam combiner 44b, a wavefront adjuster 611b, and the high-reflection mirror 615 may be housed in the housing 302.

The amplifier 83a may be a double-pass amplifier. For example, a P-polarization component of the laser beam L1 may be transmitted through a polarization beam splitter 91a with high transmittance and enter the amplifier 83a through a first window 830a. Then, the laser beam L1 may be outputted through a second window 830b after being amplified in the amplifier 83a. The laser beam L1 that has been outputted through the second window 830b may be reflected by a reflective phase retarder 92a to thereby be converted into a circularly polarized laser beam L1. Then, the laser beam L1 may be reflected by a high-reflection mirror 93a and reflected again by the reflective phase retarder 92a to thereby be converted into a linearly polarized laser beam L1. Thereafter, the laser beam L1 may enter the amplifier 83a through the second window 830b and be amplified in the amplifier 83a. Then, the laser beam L1 may be outputted through the first window 830a. An S-polarization component of the laser beam L1 outputted through the first window 830a may be reflected by the polarization beam splitter 91a with high reflectance and guided to the downstream detection unit 74. The guide laser beam L2 may follow along the same beam path.

In FIG. 27, the interior of the amplifier 83b is not depicted, but may be similar to that of the amplifier 83a or 83c. Further, the interior of the housing 303 is not depicted, but may be similar to that of the housing 302 or 304.

5.9 Modification of Beam Path Adjuster

Figure 28:
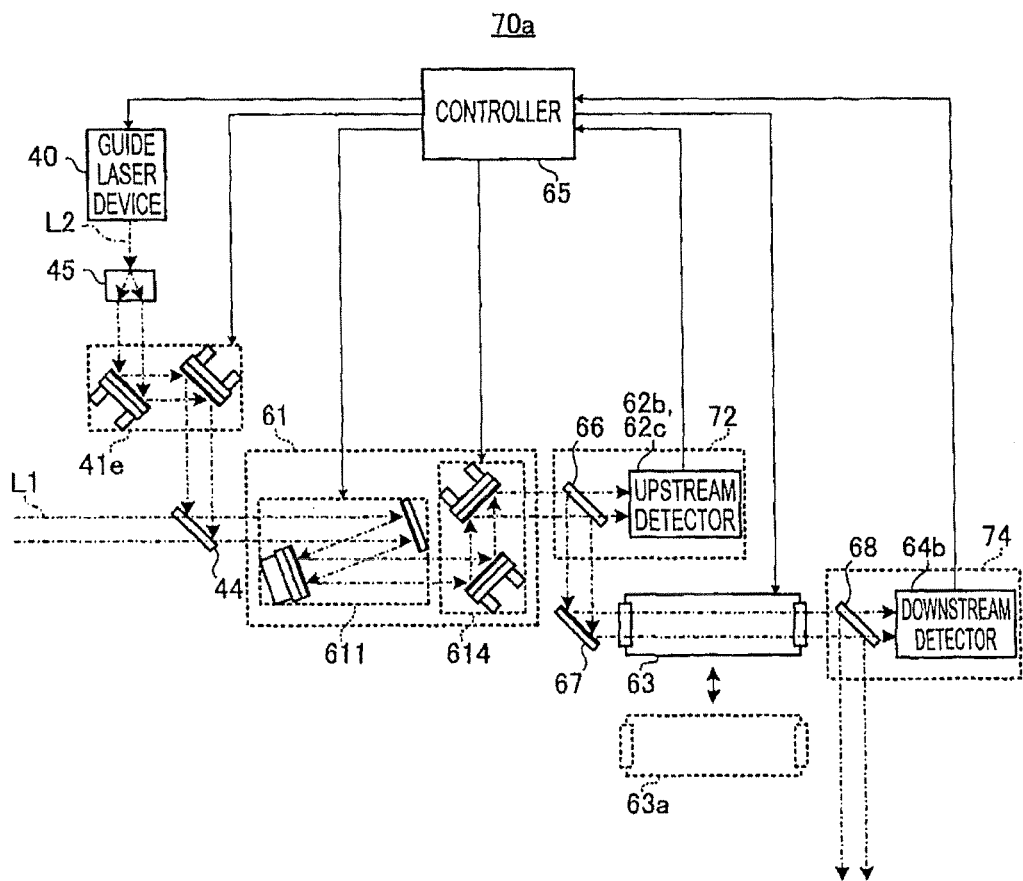
FIG. 28 schematically illustrates a modification of a beam path adjuster.

FIG. 28 schematically illustrates a modification of a beam path adjuster. In the second embodiment, a beam path adjuster 41e may be provided in a beam path of the guide laser beam L2 upstream from the laser beam combiner 44. Accordingly, the beam path of the guide laser beam L2 may be adjusted to reduce a difference between the beam path of the laser beam L1 and the beam path of the guide laser beam L2.

6. Configuration of Controller

Those skilled in the art will recognize that the subject matter described herein may be implemented by a general purpose computer or a programmable controller in combination with program modules or software applications. Generally, program modules include routines, programs, components, data structures, and so forth that can perform process as discussed in the present disclosure.

Figure 29:
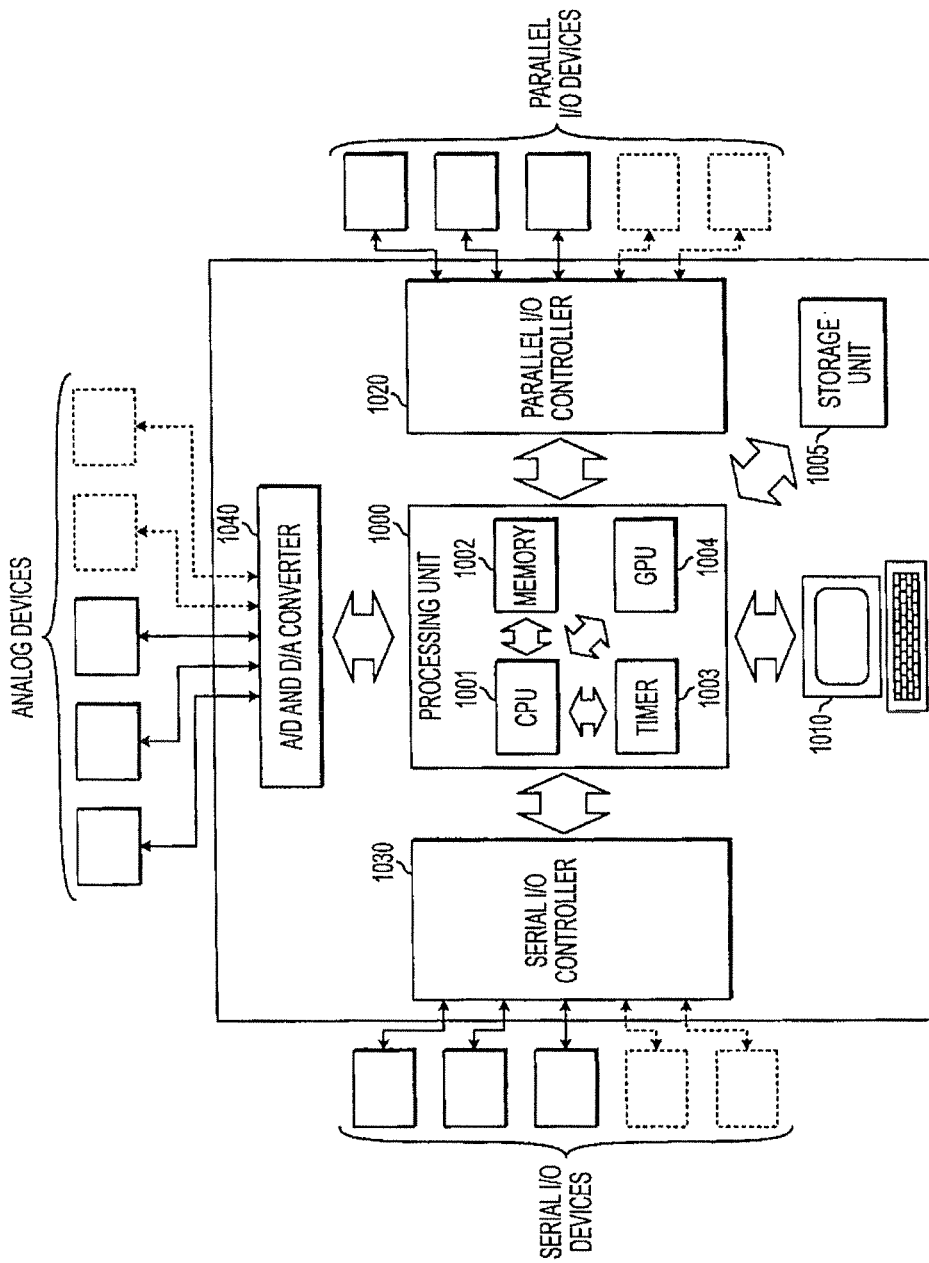
FIG. 29 is a block diagram showing an exemplary hardware environment in which various aspects of the disclosed subject matter may be implemented.

FIG. 29 is a block diagram showing an exemplary hardware environment in which various aspects of the disclosed subject matter may be implemented. An exemplary environment 100 in FIG. 29 may include, but not limited to, a processing unit 1000, a storage unit 1005, a user interface 1010, a parallel input/output (I/O) controller 1020, a serial I/O controller 1030, and an analog-to-digital (A/D) and digital-to-analog (D/A) converter 1040.

The processing unit 1000 may include a central processing unit (CPU) 1001, a memory 1002, a timer 1003, and a graphics processing unit (GPU) 1004. The memory 1002 may include a random access memory (RAM) and a read only memory (ROM). The CPU 1001 may be any of various commercially available processors. Dual microprocessors and other multi-processor architectures may also be employed as the CPU 1001.

These components in FIG. 29 may be interconnected to one another to perform the processes discussed in the present disclosure.

In operation, the processing unit 1000 may load programs stored in the storage unit 1005 to execute them, read data from the storage unit 1005 in accordance with the programs, and write data in the storage unit 1005. The CPU 1001 may execute the programs loaded from the storage unit 1005. The memory 1002 may be a work area to temporally store programs to be executed by the CPU 1001 and data to be used for the operations of the CPU 1001. The timer 116 may measure time intervals to provide the CPU 1001 with a measured result in accordance with the execution of the program. The GPU 1004 may process image data and provide the CPU 1001 with a processing result, in accordance with a program to be loaded from the storage unit 1005.

The parallel I/O controller 1020 may be coupled to parallel I/O devices, such as the EUV light generation controller 5, which can communicate with the processing unit 1000, and control communication between the processing unit 1000 and those parallel I/O devices. The serial I/O controller 1030 may be coupled to serial I/O devices, such as the beam adjust adjusting unit 61, the upstream detection unit 62, and the downstream detection unit 64, which can communicate with the processing unit 1000, and control communication between the processing unit 1000 and those serial I/O devices. The A/D and D/A converter 1040 may be coupled to analog devices such as a temperature sensor, a pressure sensor, and a vacuum gauge, through analog ports.

The user interface 1010 may display progress of executing programs by the processing unit 1000 for an operator so that the operator can instruct the processing unit 1000 to stop execution of the programs or to execute an interruption routine.

The exemplary I/O controllers 1020 and 1030 can be use to implement each of the EUV light generation controller 5 and the controller 65 in the present disclosure. Persons skilled in the art will appreciate that those controllers can be implemented in distributed computing environments where tasks are performed by processing units that are linked through any type of a communications network. As discussed in the present disclosure, the EUV light generation controller 5 and the controller 65 can be connected to each other through a communication network such as Ethernet. In a distributed computing environment, program modules may be located in both local and remote memory storage devices.

The above-described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. A laser apparatus, comprising:
   a master oscillator;
   an optical unit provided in a beam path of a laser beam from the master oscillator;
   a beam adjusting unit provided upstream from the optical unit in a beam path of the laser beam and configured for adjusting at least a beam path of the laser beam;
   a first detection unit provided between the beam adjusting unit and the optical unit in a beam path of the laser beam and configured for detecting the laser beam and outputting a detection value pertaining to the beam path of the laser beam;
   a second detection unit provided downstream from the optical unit in a beam path of the laser beam and configured for detecting the laser beam; and
   a controller configured for controlling the beam adjusting unit based on outputs from the first and second detection units.

2. The laser apparatus according to claim 1, wherein the controller is configured to:
   obtain a first detection result to be outputted from the second detection unit in a case where a detection value outputted from the first detection unit is a first value, and obtain a second detection result to be outputted from the second detection unit in a case where a detection value outputted from the first detection unit is a second value; and
   control the beam adjusting unit based on the first and second detection results.

3. The laser apparatus according to claim 1, wherein the controller is configured to:
   control the beam adjusting unit such that a detection value to be outputted from the first detection unit is a first value to obtain a first detection result outputted from the second detection unit;
   control the beam adjusting unit such that a detection value to be outputted from the first detection unit is a second value to obtain a second detection result outputted from the second detection unit; and
   control the beam adjusting unit base on the first and second detection results such that a detection value to be outputted from the first detection unit is either the first value or the second value.

4. The laser apparatus according to claim 1, wherein
   the beam adjusting unit is configured for adjusting a wavefront of the laser beam, and
   the first detection unit is configured for outputting a detection value pertaining to a wavefront of the laser beam.

5. The laser apparatus according to claim 1, wherein
   the optical unit includes an amplifier configured for amplifying the laser beam,
   the beam adjusting unit is configured for adjusting a beam path and a wavefront of the laser beam,
   the first detection unit is configured for outputting a detection value pertaining to a beam path of the laser beam and a detection value pertaining to a wavefront of the laser beam, and
   the controller is configured for carrying out, in a state where the amplifier is not in operation,
   (a) processing for adjusting a beam path of the laser beam by
      obtaining a first detection result to be outputted from the second detection unit in a case where a detection value outputted from the first detection unit pertaining to the beam path is a first value and a second detection result to be outputted from the second detection unit in a case where a detection value outputted from the first detection unit pertaining to the beam path is a second value, and
      controlling the beam adjusting unit based on the first and second detection results, and
   (b) processing for adjusting a wavefront of the laser beam by:
      obtaining a third detection result to be outputted from the second detection unit in a case where a detection value outputted from the first detection unit pertaining to the wavefront is a third value and a fourth detection result to be outputted from the second detection unit in a case where a detection value outputted from the first detection unit pertaining to the wavefront is a fourth value, and
      controlling the beam adjusting unit based on the third and fourth detection results, after the processing (a).

6. The laser apparatus according to claim 1, wherein
   the second detection unit is configured for outputting a beam profile along a section of the laser beam, and
   the controller is configured to:
      obtain a beam profile along a section of the laser beam from the second detection unit,
      calculate a value pertaining to symmetry of the beam profile, and
      control the beam adjusting unit based on a value pertaining to symmetry of the beam profile.

7. The laser apparatus according to claim 1, wherein
   the second detection unit is configured for outputting a value pertaining to energy of the laser beam, and
   the controller is configured to:
      obtain a value pertaining to energy of the laser beam from the second detection unit, and
      control the beam adjusting unit based on a value pertaining to the energy.

8. The laser apparatus according to claim 1, further comprising:
   a guide laser device configured for outputting a guide laser beam; and
   a beam path combiner provided upstream from the beam adjusting unit in a beam path of the laser beam and configured to cause beam paths of the laser beam and the guide laser beam to substantially coincide with each other, wherein:
   the beam adjusting unit is configured for adjusting beam paths of the laser beam and the guide laser beam,
   the first detection unit is configured for outputting a detection value pertaining to a beam path of the guide laser beam, and
   the controller is configured to control a beam path of the laser beam by:
      obtaining a first detection result to be outputted from the second detection unit in a case where a detection value outputted from the first detection unit pertaining to the beam path of a first value and a second detection result to be outputted from the second detection unit in a case where a detection value outputted from the first detection unit pertaining to the beam path is a second value, and controlling the beam adjusting unit based on the first and second detection results.

9. A system for generating extreme ultraviolet light, the system comprising:
   a laser apparatus that includes:
   a master oscillator;
   an optical unit provided in a beam path of a laser beam from the master oscillator;
   a beam adjusting unit provided upstream from the optical unit in a beam path of the laser beam and configured for adjusting at least one of a beam path and a wavefront of the laser beam;
   a first detection unit provided between the beam adjusting unit and the optical unit in a beam path of the laser beam and configured for detecting the laser beam;
   a second detection unit provided downstream of the optical unit in a beam path of the laser beam and configured for detecting the laser beam; and
   a controller configured for controlling the beam adjusting unit based on outputs from the first and second detection units;
   a chamber provided downstream from the laser apparatus in a beam path of the laser beam and having an inlet formed at a position at which the laser beam can be introduced into the chamber;
   a target supply device provided in the chamber and configured for supplying a target material to a predetermined region inside the chamber; and
   a focusing optical system configured for focusing the laser beam in the predetermined region.

10. A laser apparatus, comprising;
    a master oscillator;
    an optical unit provided in a beam path of a laser beam from the master oscillator;
    a beam adjusting unit provided upstream from the optical unit in a beam path of the laser beam and configured for adjusting at least a wavefront of the laser beam;
    a first detection unit provided between the beam adjusting unit and the optical unit in a beam path of the laser beam and configured for detecting the laser beam and outputting a detection value pertaining to the wavefront of the laser beam;
    a second detection unit provided downstream from the optical unit in a beam path of the laser beam and configured for detecting the laser beam; and
    a controller configured for controlling the beam adjusting unit based on outputs from the first and second detection units, wherein
    the beam adjusting unit is provided between the master oscillator and the first detection unit.

11. The laser apparatus according to claim 10, wherein the controller is configured to:
    obtain a first detection result to be outputted from the second detection unit in a case where a detection value outputted from the first detection unit is a first value, and obtain a second detection result to be outputted from the second detection unit in a case where a detection value outputted from the first detection unit is a second value; and
    control the beam adjusting unit based on the first and second detection results.

12. The laser apparatus according to claim 10, wherein the controller is configured to:
    control the beam adjusting unit such that a detection value to be outputted from the first detection unit is a first value to obtain a first detection result outputted from the second detection unit;
    control the beam adjusting unit such that a detection value to be outputted from the first detection unit is a second value to obtain a second detection result outputted from the second detection unit; and
    control the beam adjusting unit based on the first and second detection results such that a detection value to be outputted from the first detection unit is either the first value or the second value.

13. The laser apparatus according to claim 10, wherein
    the beam adjusting unit is configured for adjusting a beam path of the laser beam, and
    the first detection unit is configured for outputting a detection value pertaining to a beam path of the laser beam.

14. The laser apparatus according to claim 10, wherein
    the optical unit includes an amplifier configured for amplifying the laser beam,
    the beam adjusting unit is configured for adjusting a beam path and a wavefront of the laser beam,
    the first detection unit is configured for outputting a detection value pertaining to a beam path of the laser beam and detection value pertaining to wavefront of the laser beam, and
    the controller is configured for carrying out, in a state where the amplifier is not in operation,
    (a) processing for adjusting a beam path of the laser beam by:
      obtaining a first detection result to be outputted from the second detection unit in a case where a detection value outputted from the first detection unit pertaining to the beam path is a first value and a second detection result to be outputted from the second detection unit in a case where a detection value outputted from the first detection unit pertaining to the beam path is a second value, and
      controlling the beam adjusting unit based on the first and second detection results, and
    (b) processing for adjusting a wavefront of the laser beam by:
      obtaining a third detection result to be outputted from the second detection unit in a case where a detection value outputted from the first detection unit pertaining to the wavefront is a third value and a fourth detection result to be outputted from the second detection unit in a case where a detection value outputted from the first detection unit pertaining to the wavefront is a fourth value, and
      controlling the beam adjusting unit based on the third and fourth detection results, after the processing (a).

15. The laser apparatus according to claim 10, wherein
    the second detection unit is configured for outputting a beam profile along a section of the laser beam, and
    the controller is configured to:
      obtain a beam profile along a section of the laser beam from the second detection unit,
      calculate a value pertaining to symmetry of the beam profile, and
      control the beam adjusting unit based on a value pertaining to symmetry of the beam profile.

16. The laser apparatus according to claim 10, wherein
    the second detection unit is configured for outputting a value pertaining to energy of the laser beam, and the controller is configured to:
  obtain a value pertaining to energy of the laser beam from the second detection unit, and
  control the beam adjusting unit based on a value pertaining to the energy.

17. The laser apparatus according to claim 10, further comprising;
  a guide laser device configured for outputting a guide laser beam; and
  a beam path combiner provided upstream from the beam adjusting unit in a beam path of the laser beam and configured to cause beam paths of the laser beam and the guide laser beam to substantially coincide with each other, wherein
  the beam adjusting unit is configured for adjusting beam paths of the laser beam and the guide laser beam,
  the first detection unit is configured for outputting a detection value pertaining to a beam path of the guide laser beam, and
  the controller is configured to control a beam path of the laser beam by:
    obtaining a first detection result to be outputted from the second detection unit in a case where a detection value outputted from the first detection unit pertaining to the beam path of a first value and a second detection result to be outputted from the second detection unit in a case where a detection value outputted from the first detection unit pertaining to the beam path is a second value, and
    controlling the beam adjusting unit based on the first and second detection results.

* * * * *